United States Patent
Chen et al.

(10) Patent No.: US 12,381,277 B2
(45) Date of Patent: Aug. 5, 2025

(54) ELECTROCHEMICAL CELLS WITH FLAME RETARDANT MECHANISM AND METHODS OF PRODUCING THE SAME

(71) Applicant: 24M Technologies, Inc., Cambridge, MA (US)

(72) Inventors: Junzheng Chen, Concord, MA (US); Naoki Ota, Lexington, MA (US); Xiaoming Liu, Newton, MA (US); Landon Oakes, Cambridge, MA (US); Jeffry Disko, Lexington, MA (US)

(73) Assignee: 24M Technologies, Inc., Cambridge, MA (US)

( * ) Notice: Subject to any disclaimer, the term of this patent is extended or adjusted under 35 U.S.C. 154(b) by 910 days.

(21) Appl. No.: 17/350,095

(22) Filed: Jun. 17, 2021

(65) Prior Publication Data
US 2022/0052403 A1 Feb. 17, 2022

Related U.S. Application Data

(60) Provisional application No. 63/040,154, filed on Jun. 17, 2020.

(51) Int. Cl.
*H01M 50/143* (2021.01)
*C09D 5/18* (2006.01)
(Continued)

(52) U.S. Cl.
CPC ............ *H01M 50/143* (2021.01); *C09D 5/18* (2013.01); *H01M 50/105* (2021.01); *H01M 50/1243* (2021.01)

(58) Field of Classification Search
None
See application file for complete search history.

(56) References Cited

U.S. PATENT DOCUMENTS 2,208,028 A 7/1940 Harrington
3,624,628 A 11/1971 Schmidt
(Continued)

FOREIGN PATENT DOCUMENTS

CA 2876416 A1 12/2013
CA 2895142 A1 6/2014
(Continued)

OTHER PUBLICATIONS

Armand, M. et al., "Conjugated dicarboxylate anodes for Li-ion batteries," Nature Materials, Feb. 2009, 8(2); pp. 120-125.
(Continued)

*Primary Examiner* — Haixia Zhang
(74) *Attorney, Agent, or Firm* — Cooley LLP

(57) ABSTRACT

Apparatus, systems, and methods described herein relate to the manufacture and use of electrochemical cells with a flame retardant mechanism. In some embodiments, an electrochemical cell includes a first current collector coupled to a first portion of a first pouch, the first current collector having a first electrode material disposed thereon. The electrochemical cell further includes a second current collector coupled to a second portion of the first pouch, the second current collector having a second electrode material disposed thereon. The electrochemical cell further includes a separator disposed between the first electrode material and the second electrode material, the first portion of the first pouch coupled to the second portion of the first pouch to enclose the electrochemical cell. The electrochemical cell further includes a flame retardant material coated to the first pouch and a second pouch, the second pouch enclosing the first pouch and the flame retardant material.

15 Claims, 12 Drawing Sheets

(51) Int. Cl.
  *H01M 50/105* (2021.01)
  *H01M 50/124* (2021.01)

(56) References Cited

U.S. PATENT DOCUMENTS

| | | |
|---|---|---|
| 3,982,966 A | 9/1976 | Beatty et al. |
| 4,080,728 A | 3/1978 | Buckler |
| 4,092,464 A | 5/1978 | Dey et al. |
| 4,105,815 A | 8/1978 | Buckler |
| 4,199,912 A | 4/1980 | James, Jr. et al. |
| 4,386,019 A | 5/1983 | Kaun et al. |
| 4,576,878 A | 3/1986 | Gahn |
| 4,623,598 A | 11/1986 | Waki et al. |
| 4,695,355 A | 9/1987 | Koziol |
| 4,788,112 A | 11/1988 | Kung |
| 4,818,643 A | 4/1989 | Cook et al. |
| 4,925,752 A | 5/1990 | Fauteux et al. |
| 5,316,556 A | 5/1994 | Morris |
| 5,582,931 A | 12/1996 | Kawakami |
| 5,603,770 A | 2/1997 | Sato |
| 5,612,152 A | 3/1997 | Bates |
| 5,674,556 A | 10/1997 | Fukumura et al. |
| 5,697,145 A | 12/1997 | Fukumura et al. |
| 5,725,822 A | 3/1998 | Keller et al. |
| 5,749,927 A | 5/1998 | Chern et al. |
| 5,792,576 A | 8/1998 | Xing et al. |
| 5,814,420 A | 9/1998 | Chu |
| 5,834,052 A | 11/1998 | Fukumura et al. |
| 5,837,397 A | 11/1998 | Xing |
| 6,060,864 A | 5/2000 | Ito et al. |
| 6,207,322 B1 | 3/2001 | Kelsey et al. |
| 6,264,707 B1 | 7/2001 | Ishikawa et al. |
| 6,284,192 B1 | 9/2001 | Coonan et al. |
| 6,287,722 B1 | 9/2001 | Barton et al. |
| 6,291,091 B1 | 9/2001 | Preischl et al. |
| 6,296,967 B1 | 10/2001 | Jacobs et al. |
| 6,296,971 B1 | 10/2001 | Hara |
| 6,306,215 B1 | 10/2001 | Larkin |
| 6,368,365 B1 | 4/2002 | Chi et al. |
| 6,403,262 B1 | 6/2002 | Xing et al. |
| 6,461,757 B1 | 10/2002 | Sasayama et al. |
| 6,503,432 B1 | 1/2003 | Barton et al. |
| 6,503,657 B1 | 1/2003 | Takami et al. |
| 6,576,365 B1 | 6/2003 | Meitav et al. |
| 6,582,480 B2 | 6/2003 | Pasquier et al. |
| 6,589,299 B2 | 7/2003 | Missling et al. |
| 6,803,145 B1 | 10/2004 | Von During |
| 6,939,383 B2 | 9/2005 | Eastin et al. |
| 6,986,967 B2 | 1/2006 | Barton et al. |
| 7,002,265 B2 | 2/2006 | Potega |
| 7,022,391 B2 | 4/2006 | Kawai et al. |
| 7,041,380 B2 | 5/2006 | Yamashita et al. |
| 7,338,734 B2 | 3/2008 | Chiang et al. |
| 7,524,577 B2 | 4/2009 | Bates |
| 7,700,019 B2 | 4/2010 | Lavoie et al. |
| 7,734,317 B2 | 6/2010 | Patel et al. |
| 7,846,575 B2 | 12/2010 | Heller, Jr. et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,790,801 B2 | 7/2014 | Reynolds |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,368,773 B2 | 6/2016 | Gendlin et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,509,176 B2 | 11/2016 | Carter et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,511,310 B2 | 12/2019 | Chiang et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,586,999 B2 | 3/2020 | Locke et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Tony et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Yet-Ming et al. |
| 11,024,903 B2 | 6/2021 | Naoki et al. |
| 11,094,487 B2 | 8/2021 | Lawrence et al. |
| 11,094,976 B2 | 8/2021 | Yet-Ming et al. |
| 11,108,107 B2 | 8/2021 | Kim et al. |
| 11,121,437 B2 | 9/2021 | Ricardo et al. |
| 11,139,467 B2 | 10/2021 | Raymond et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,462,722 B2 | 10/2022 | Aranami et al. |
| 11,469,065 B2 | 10/2022 | Lawrence et al. |
| 11,476,551 B2 | 10/2022 | Matthew et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 11,764,353 B2 | 9/2023 | Ota et al. |
| 11,804,595 B2 | 10/2023 | Ota et al. |
| 11,811,119 B2 | 11/2023 | Chiang et al. |
| 11,831,026 B2 | 11/2023 | Ota et al. |
| 11,855,250 B2 | 12/2023 | Taylor et al. |
| 11,876,194 B2 | 1/2024 | Chiang et al. |
| 11,888,144 B2 | 1/2024 | Slocum et al. |
| 11,909,077 B2 | 2/2024 | Chiang et al. |
| 11,942,654 B2 | 3/2024 | Bazzarella et al. |
| 11,961,990 B2 | 4/2024 | Ota et al. |
| 11,984,564 B1 | 5/2024 | Chen |
| 12,009,551 B2 | 6/2024 | Bazzarella et al. |
| 12,068,445 B2 | 8/2024 | Bazzarella et al. |
| 12,068,486 B2 | 8/2024 | Lawrence et al. |
| 2001/0000423 A1 | 4/2001 | Fischer et al. |
| 2001/0012588 A1 | 8/2001 | Kaido et al. |
| 2001/0021471 A1 | 9/2001 | Xing et al. |
| 2002/0022180 A1 | 2/2002 | Olsen et al. |
| 2002/0106561 A1 | 8/2002 | Lee et al. |
| 2003/0071337 A1 | 4/2003 | Mitani et al. |
| 2003/0116556 A1 | 6/2003 | Li |
| 2003/0116881 A1 | 6/2003 | Nelson et al. |
| 2003/0205835 A1 | 11/2003 | Eastin et al. |
| 2004/0029001 A1 | 2/2004 | Yamazaki et al. |

(56) References Cited

U.S. PATENT DOCUMENTS

| | | |
|---|---|---|
| 2004/0029008 A1 | 2/2004 | Winterberg et al. |
| 2004/0029311 A1 | 2/2004 | Snyder et al. |
| 2004/0131934 A1 | 7/2004 | Sugnaux et al. |
| 2004/0264110 A1 | 12/2004 | Michel et al. |
| 2005/0035741 A1 | 2/2005 | Elder et al. |
| 2005/0037262 A1 | 2/2005 | Vallee et al. |
| 2005/0064270 A1 | 3/2005 | Marianowski |
| 2005/0123815 A1 | 6/2005 | Tsai et al. |
| 2005/0214648 A1 | 9/2005 | Boulton et al. |
| 2006/0046137 A1 | 3/2006 | Kodama |
| 2006/0057433 A1 | 3/2006 | Ando et al. |
| 2006/0152224 A1 | 7/2006 | Kim et al. |
| 2006/0267545 A1 | 11/2006 | Lee et al. |
| 2007/0034251 A1 | 2/2007 | Jonczyk et al. |
| 2008/0096110 A1 | 4/2008 | Bito et al. |
| 2008/0289676 A1 | 11/2008 | Guidotti et al. |
| 2008/0299451 A1 | 12/2008 | Funahashi et al. |
| 2009/0023041 A1 | 1/2009 | Cooper |
| 2009/0029259 A1 | 1/2009 | Okazaki et al. |
| 2009/0115252 A1 | 5/2009 | Caraghiorghiopol et al. |
| 2009/0186270 A1 | 7/2009 | Harada et al. |
| 2010/0040942 A1 | 2/2010 | Hatta et al. |
| 2010/0047671 A1 | 2/2010 | Chiang et al. |
| 2010/0060231 A1 | 3/2010 | Trainor et al. |
| 2010/0097033 A1 | 4/2010 | Tange |
| 2010/0104817 A1 | 4/2010 | Carlson |
| 2010/0112454 A1 | 5/2010 | Visco et al. |
| 2010/0164437 A1 | 7/2010 | McKinley et al. |
| 2010/0190081 A1 | 7/2010 | Park et al. |
| 2010/0196800 A1 | 8/2010 | Markoski et al. |
| 2010/0248026 A1 | 9/2010 | Hinoki et al. |
| 2010/0323264 A1 | 12/2010 | Chiang et al. |
| 2011/0086258 A1 | 4/2011 | Yaginuma et al. |
| 2011/0104527 A1 | 5/2011 | Choi et al. |
| 2011/0123855 A1 | 5/2011 | Kim et al. |
| 2011/0129722 A1 | 6/2011 | Yoneda |
| 2011/0183169 A1 | 7/2011 | Bhardwaj et al. |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2011/0274948 A1 | 11/2011 | Duduta et al. |
| 2011/0287314 A1 | 11/2011 | Jung |
| 2011/0300440 A1 | 12/2011 | Matsuda et al. |
| 2011/0311857 A1 | 12/2011 | Tucholski |
| 2012/0003547 A1 | 1/2012 | Raj |
| 2012/0050848 A1 | 3/2012 | Carlson et al. |
| 2012/0058378 A1 | 3/2012 | Lee et al. |
| 2012/0069429 A1 | 3/2012 | Barrett et al. |
| 2012/0070715 A1 | 3/2012 | Obika |
| 2012/0121963 A1 | 5/2012 | Kwon et al. |
| 2012/0135257 A1 | 5/2012 | Carlson et al. |
| 2012/0164499 A1 | 6/2012 | Chiang et al. |
| 2012/0177981 A1 | 7/2012 | Kim |
| 2012/0315537 A1 | 12/2012 | Ravdel et al. |
| 2013/0000110 A1 | 1/2013 | Takeda et al. |
| 2013/0029205 A1 | 1/2013 | Adams et al. |
| 2013/0029206 A1 | 1/2013 | Lev |
| 2013/0055559 A1 | 3/2013 | Slocum et al. |
| 2013/0065122 A1 | 3/2013 | Chiang et al. |
| 2013/0071696 A1* | 3/2013 | Kim .................. H01M 50/178 429/7 |
| 2013/0131744 A1 | 5/2013 | Viavattine |
| 2013/0230641 A1 | 9/2013 | Suzuki |
| 2013/0256198 A1 | 10/2013 | Ellis et al. |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0008006 A1 | 1/2014 | Lee et al. |
| 2014/0030623 A1 | 1/2014 | Chiang et al. |
| 2014/0039710 A1 | 2/2014 | Carter et al. |
| 2014/0079992 A1 | 3/2014 | Tanaka |
| 2014/0125270 A1 | 5/2014 | Luo et al. |
| 2014/0131630 A1 | 5/2014 | Hwang et al. |
| 2014/0154546 A1 | 6/2014 | Carter et al. |
| 2014/0154565 A1 | 6/2014 | Ku et al. |
| 2014/0170524 A1 | 6/2014 | Chiang et al. |
| 2014/0248521 A1 | 9/2014 | Chiang et al. |
| 2014/0255762 A1 | 9/2014 | Lee et al. |
| 2014/0272547 A1 | 9/2014 | Ramasubramanian et al. |
| 2014/0315097 A1 | 10/2014 | Tan et al. |
| 2014/0356736 A1 | 12/2014 | Choi et al. |
| 2014/0363721 A1 | 12/2014 | Bhola et al. |
| 2015/0024279 A1 | 1/2015 | Tan et al. |
| 2015/0027615 A1 | 1/2015 | Singh et al. |
| 2015/0129081 A1 | 5/2015 | Chiang et al. |
| 2015/0140371 A1 | 5/2015 | Slocum |
| 2015/0155596 A1 | 6/2015 | Gardner |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0031791 A1 | 2/2016 | Clark et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0301038 A1 | 10/2016 | Modest et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0098857 A1 | 4/2017 | Carlson et al. |
| 2017/0162863 A1 | 6/2017 | Tristan et al. |
| 2017/0214031 A1 | 7/2017 | Lee et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Ryan et al. |
| 2020/0014025 A1 | 1/2020 | Zagars et al. |
| 2020/0044296 A1 | 2/2020 | Yet-Ming et al. |
| 2020/0106094 A1 | 4/2020 | Naoki et al. |
| 2020/0127337 A1 | 4/2020 | Kim et al. |
| 2020/0161688 A1 | 5/2020 | Chiang et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Junzheng et al. |
| 2020/0365858 A1 | 11/2020 | Jaspers et al. |
| 2020/0395583 A1 | 12/2020 | Carlson et al. |
| 2020/0411825 A1 | 12/2020 | Bazzarella et al. |
| 2021/0083277 A1 | 3/2021 | Yamashita et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |

(56) References Cited

U.S. PATENT DOCUMENTS

| | | | |
|---|---|---|---|
| 2021/0249696 A1 | 8/2021 | Maniwa et al. |
| 2021/0265631 A1 | 8/2021 | Chen et al. |
| 2021/0288362 A1 | 9/2021 | Churchill |
| 2021/0296733 A1 | 9/2021 | Carlson et al. |
| 2021/0344035 A1 | 11/2021 | He et al. |
| 2021/0344037 A1 | 11/2021 | He et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0344775 A1 | 10/2022 | Carlson et al. |
| 2022/0344776 A1 | 10/2022 | Carlson |
| 2022/0352597 A1 | 11/2022 | Chen et al. |
| 2022/0352598 A1 | 11/2022 | Avison et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2023/0411695 A1 | 12/2023 | Narita et al. |
| 2024/0039001 A1 | 2/2024 | Kusachi et al. |
| 2024/0039120 A1 | 2/2024 | Carlson |
| 2024/0047689 A1 | 2/2024 | Hartzog et al. |
| 2024/0047772 A1 | 2/2024 | Hartzog et al. |
| 2024/0047810 A1 | 2/2024 | Hartzog et al. |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0234705 A1 | 7/2024 | Ota et al. |
| 2024/0274855 A1 | 8/2024 | Chiang et al. |
| 2024/0274864 A1 | 8/2024 | Taylor |

FOREIGN PATENT DOCUMENTS

| | | |
|---|---|---|
| CN | 1333929 A | 1/2002 |
| CN | 1354529 A | 6/2002 |
| CN | 1791999 A | 6/2006 |
| CN | 1883075 A | 12/2006 |
| CN | 101171703 A | 4/2008 |
| CN | 101212070 A | 7/2008 |
| CN | 101669231 A | 3/2010 |
| CN | 101796654 A | 8/2010 |
| CN | 102089921 A | 6/2011 |
| CN | 102549808 A | 7/2012 |
| CN | 102593500 A | 7/2012 |
| CN | 102983369 A | 3/2013 |
| CN | 103647114 A | 3/2014 |
| CN | 103730703 A | 4/2014 |
| CN | 103959515 A | 7/2014 |
| CN | 104009192 A | 8/2014 |
| CN | 104040764 A | 9/2014 |
| CN | 102769122 B | 10/2014 |
| CN | 203871438 U | 10/2014 |
| CN | 103855332 B | 4/2017 |
| CN | 107112444 A | 8/2017 |
| CN | 111384404 A | 7/2020 |
| DE | 102012022346 A1 | 5/2014 |
| DE | 102013202367 A1 | 8/2014 |
| DE | 102013203107 A1 | 8/2014 |
| DE | 102013210323 A1 | 12/2014 |
| DE | 102014213916 A1 | 1/2016 |
| DE | 102015011663 A1 | 7/2016 |
| DE | 102019109472 A1 | 10/2020 |
| EP | 0075842 B1 | 8/1986 |
| EP | 0602976 A1 | 6/1994 |
| EP | 1422769 A1 | 5/2004 |
| FR | 2551172 A1 | 3/1985 |
| FR | 2800916 A1 | 5/2001 |
| FR | 2986374 A1 | 8/2013 |
| GB | 1393726 A | 5/1975 |
| JP | S4728438 A | 11/1972 |
| JP | S628932 B2 | 2/1987 |
| JP | S62117261 A | 5/1987 |
| JP | H0294619 A | 4/1990 |
| JP | H06187998 A | 7/1994 |
| JP | H1027602 A | 1/1998 |
| JP | H11111265 A | 4/1999 |
| JP | 2000182581 A | 6/2000 |
| JP | 2000260423 A | 9/2000 |
| JP | 2000285886 A | 10/2000 |
| JP | 2001357882 A | 12/2001 |
| JP | 2002078229 A | 3/2002 |
| JP | 2002359006 A | 12/2002 |
| JP | 2003123832 A | 4/2003 |
| JP | 2003532277 A | 10/2003 |
| JP | 2003317731 A | 11/2003 |
| JP | 2004158222 A | 6/2004 |
| JP | 2005056729 A | 3/2005 |
| JP | 2005071658 A | 3/2005 |
| JP | 2006147534 A | 6/2006 |
| JP | 2006172766 A | 6/2006 |
| JP | 2006172773 A | 6/2006 |
| JP | 2006269288 A | 10/2006 |
| JP | 2006324114 A | 11/2006 |
| JP | 2007115678 A | 5/2007 |
| JP | 3993223 B2 | 10/2007 |
| JP | 2007335283 A | 12/2007 |
| JP | 2008034556 A | 2/2008 |
| JP | 2008198492 A | 8/2008 |
| JP | 2009059709 A | 3/2009 |
| JP | 2009176513 A | 8/2009 |
| JP | 2010062008 A | 3/2010 |
| JP | 2010073421 A | 4/2010 |
| JP | 2010153140 A | 7/2010 |
| JP | 2010157510 A | 7/2010 |
| JP | 2010245000 A | 10/2010 |
| JP | 2011077269 A | 4/2011 |
| JP | 4873703 B2 | 2/2012 |
| JP | 2012185913 A | 9/2012 |
| JP | 2012204182 A | 10/2012 |
| JP | 2013145649 A | 7/2013 |
| JP | 2013161674 A | 8/2013 |
| JP | 2014193111 A | 10/2014 |
| JP | 2015520490 A | 7/2015 |
| JP | 2016511521 A | 4/2016 |
| JP | 6204320 B2 | 9/2017 |
| JP | 2018092724 A | 6/2018 |
| JP | 2019102421 A | 6/2019 |
| JP | 2021106164 A | 7/2021 |
| KR | 100870355 B1 | 11/2008 |

(56) References Cited

FOREIGN PATENT DOCUMENTS

| | | |
|---|---|---|
| KR | 20100016711 A | 2/2010 |
| KR | 20120023491 A | 3/2012 |
| KR | 20130098339 A | 9/2013 |
| KR | 20140005075 A | 1/2014 |
| KR | 20140039022 A | 3/2014 |
| KR | 20140085589 A | 7/2014 |
| KR | 20140144870 A | 12/2014 |
| KR | 20140148121 A | 12/2014 |
| KR | 20170018667 A | 2/2017 |
| KR | 20200091687 A | 7/2020 |
| TW | I436515 B | 5/2014 |
| TW | I470855 B | 1/2015 |
| TW | I508350 B | 11/2015 |
| WO | WO-8500248 A1 | 1/1985 |
| WO | WO-0141232 A2 | 6/2001 |
| WO | WO-03041211 A2 | 5/2003 |
| WO | WO-2006120959 A1 | 11/2006 |
| WO | WO-2009032986 A2 | 3/2009 |
| WO | WO-2009096135 A1 | 8/2009 |
| WO | WO-2009118910 A1 | 10/2009 |
| WO | WO-2010032362 A1 | 3/2010 |
| WO | WO-2010118060 A1 | 10/2010 |
| WO | WO-2010137415 A1 | 12/2010 |
| WO | WO-2010150077 A1 | 12/2010 |
| WO | WO-2011052094 A1 | 5/2011 |
| WO | WO-2011095758 A1 | 8/2011 |
| WO | WO-2011099793 A2 | 8/2011 |
| WO | WO-2012024499 A1 | 2/2012 |
| WO | WO-2012042913 A1 | 4/2012 |
| WO | WO-2012047596 A2 | 4/2012 |
| WO | WO-2012077707 A1 | 6/2012 |
| WO | WO-2012088442 A2 | 6/2012 |
| WO | WO-2013078027 A2 | 5/2013 |
| WO | WO-2013124423 A1 | 8/2013 |
| WO | WO-2013173689 A1 | 11/2013 |
| WO | WO-2014017463 A1 | 1/2014 |
| WO | WO-2014021057 A1 | 2/2014 |
| WO | WO-2014093876 A1 | 6/2014 |
| WO | WO-2014150210 A1 | 9/2014 |
| WO | WO-2015043934 A1 | 4/2015 |
| WO | WO-2016060955 A1 | 4/2016 |
| WO | WO-2016073575 A1 | 5/2016 |
| WO | WO-2016131141 A1 | 8/2016 |
| WO | WO-2020246072 A1 | 12/2020 |
| WO | WO-2021087465 A1 | 5/2021 |
| WO | WO-2021102259 A1 | 5/2021 |
| WO | WO-2022212404 A1 | 10/2022 |
| WO | WO-2023076513 A1 | 5/2023 |
| WO | WO-2024030910 A1 | 2/2024 |
| WO | WO-2024030914 A1 | 2/2024 |

OTHER PUBLICATIONS

Bervas, M. et al., "Investigation of the Lithiation and Delithiation Conversion Mechanisms in a Bismuth Fluoride Nanocomposites," Journal of The Electrochemical Society, Mar. 2006, 153(4), pp. A799-A808.
Canadian Office Action for Application No. CA20162969135 mailed Dec. 1, 2022, 5 pages.
Chan, C. K. et al., "High-performance lithium battery anodes using silicon nanowires," Nature Nanotechnology, Jan. 2008, 3(1), pp. 31-35.
Decision of Rejection for Japanese Application No. 2017-517309, mailed Feb. 2, 2021, 7 pages.
Decision to Grant for Japanese Application No. 2020-184414, mailed May 23, 2022, 3 Pages.
Duduta, M. et al., "Semi-Solid Lithium Rechargeable Flow Battery," Advanced Energy Materials, Jul. 2011, 1(4), pp. 511-516.
Examination Report for Canadian Application No. 2,962,788 dated Oct. 6, 2021, 3 pages.
Examination Report for Canadian Application No. 2,969,135, mailed Mar. 30, 2022, 3 pages.
Examination Report No. 1 for Australian Application No. 2016280285, dated Nov. 2, 2020, 6 pages.
Extended European Search Report for European Application No. 13791074.1, mailed Mar. 31, 2016, 6 pages.
Extended European Search Report for European Application No. 16812533.4, mailed Nov. 19, 2018, 7 pages.
Extended European Search Report for European Application No. 20153431.0, mailed Aug. 7, 2020, 12 pages.
Extended European Search Report for European Application No. 21196368.1, mailed Feb. 16, 2022, 8 pages.
Final Office Action mailed on Sep. 28, 2021, for U.S. Appl. No. 16/736,460, filed Jan. 7, 2020, 16 pages.
Final Rejection Office Action for U.S. Appl. No. 17/109,686 mailed on Jul. 20, 2022, 14 pages.
First Examination Report for Indian Application No. 201717010973, mailed Aug. 16, 2020, 6 pages.
First Office Action for Chinese Application No. 201580057914.4, dated Jul. 8, 2019, 17 pages.
First Office Action for Chinese Application No. 201680004584.7, dated Feb. 3, 2019, 17 pages.
First Office Action for Chinese Application No. 202110490592.X dated May 11, 2022, 21 pages.
Fourth Office Action for Chinese Application No. 201580057914.4, dated Jul. 29, 2020, 14 pages.
International Preliminary Report on Patentability for International Application No. PCT/US2020061498, mailed Jun. 2, 2022, 13 pages.
International Search Report and Written Opinion for Application No. PCT/US2022/048085, mailed Feb. 16, 2023, 16 pages.
International Search Report and Written Opinion for International Application No. PCT/US2012/054219, mailed Feb. 21, 2013, 13 pages.
International Search Report and Written Opinion for International Application No. PCT/US2013/041537, mailed Oct. 10, 2013.
International Search Report and Written Opinion for International Application No. PCT/US2015/058992, mailed Jan. 14, 2016, 10 pages.
International Search Report and Written Opinion for International Application No. PCT/US2016/038098, mailed Oct. 31, 2016, 14 pages.
International Search Report and Written Opinion for International Application No. PCT/US2022/022382, mailed Jul. 18, 2022, 14 pages.
Invitation to Pay Additional Fees for International Application No. PCT/US2020/061498, mailed Feb. 18, 2021, 13 pages.
Li, H. et al., "Li-Storage via Heterogeneous Reaction in Selected Binary Metal Fluorides and Oxides," Journal of Electrochemical Society, Oct. 2004, 151(11), pp. A1878-A1885.
Nakahara, K. et al. "Rechargeable batteries with organic radical cathodes," Chemical Physics Letters, Jun. 2002, pp. 359:351-354.
Nishide, H. et al., "Organic radical battery: nitroxide polymers as a cathode-active material," Electrochimica Acta, Nov. 2004, 50(2), pp. 827-831.
Non-Final Office Action for U.S. Appl. No. 17/169,862, dated Nov. 30, 2022, 12 pages.
Notice of Reasons for Rejection for Japanese Application No. 2021-054104, mailed Sep. 13, 2022, 4 pages.
Notice of Allowance for U.S. Appl. No. 17/109,686, dated Nov. 16, 2022, 10 pages.
Notice of Allowance for U.S. Appl. No. 17/109,686, dated Nov. 23, 2022, 5 pages.
Notice of Reasons for Rejection for Japanese Application No. 2018-088757, mailed Jan. 21, 2021, 4 pages.
Notice of Reasons for Rejection for Japanese Application No. 2015-512878, mailed Apr. 19, 2017, 7 pages.
Notice of Reasons for Rejection for Japanese Application No. 2015-512878, mailed Mar. 29, 2019, 13 pages.
Notice of Reasons for Rejection for Japanese Application No. 2015-512878, mailed Oct. 1, 2019, 6 pages.
Notice of Reasons for Rejection for Japanese Application No. 2017-517309, mailed Aug. 26, 2019, 11 pages.
Notice of Reasons for Rejection for Japanese Application No. 2017-517309, mailed May 18, 2020, 13 pages.

(56) References Cited

OTHER PUBLICATIONS

Notice of Reasons for Rejection for Japanese Application No. 2018-088757, mailed Apr. 2, 2020, 6 pages.
Notice of Reasons for Rejection for Japanese Application No. 2018-088757, mailed Apr. 8, 2019, 9 pages.
Notice of Reasons for Rejection for Japanese Application No. 2018-088757, mailed Oct. 2, 2019, 6 pages.
Notice of Reasons for Rejection for Japanese Application No. 2018-088757, mailed Oct. 27, 2020, 7 pages.
Notification of Reexamination for Chinese Application No. 201680004584.7, dated Oct. 28, 2020, 21 pages.
Office Action for Canadian Application No. 2,962,788, mailed Nov. 1, 2022, 4 pages.
Office Action for Korean Application No. 10-2017-7015132, mailed Oct. 12, 2022, 17 pages.
Office Action and Search Report for Chinese Application No. CN202110490592 mailed Feb. 23, 2023, 14 pages.
Office Action Final for U.S. Appl. No. 16/736,460, mailed Sep. 28, 2021, 16 pages.
Office Action for Canadian Application No. 2,962,788, mailed Mar. 31, 2022, 4 pages.
Office Action for Japanese Application No. 2021-054104, mailed Dec. 27, 2021, 7 pages.
Office Action for U.S. Appl. No. 16/201,283, mailed Oct. 23, 2020, 13 pages.
Office Action for U.S. Appl. No. 17/109,686, mailed Feb. 9, 2022, 15 pages.
Office Action for Vietnam Application No. 1-2017-01769, dated Jan. 29, 2021, 2 pages.
Office Action for European Application No. 13791074.1, mailed Aug. 7, 2018, 5 pages.
Office Action for European Application No. 15794037.0, dated Aug. 27, 2020, 7 pages.
Office Action for European Application No. 15794037.0, dated Jan. 3, 2020, 6 pages.
Office Action for European Application No. 15794037.0, dated Jun. 4, 2019, 9 pages.
Office Action for European Application No. 16812533.4, mailed Jul. 31, 2020, 4 pages.
Office Action for Indian Application No. 201717017343, mailed Jul. 9, 2020, 6 pages.
Office Action for Indian Application No. IN201717010973 dated Feb. 3, 2023, 2 pages.
Office Action for Japanese Application No. 2017-526929, mailed Feb. 18, 2020, 19 pages.
Office Action for Japanese Application No. 2021-092052, mailed Mar. 28, 2022, 13 pages.
Office Action for Japanese Application No. JP20210092052 dated Feb. 7, 2023, 9 pages.
Office Action for Korean Application No. KR20177018200 mailed Feb. 21, 2023, 14 pages.
Office Action for U.S. Appl. No. 13/607,021, mailed Apr. 20, 2015, 8 pages.
Office Action for U.S. Appl. No. 13/607,021, mailed Jul. 10, 2015, 4 pages.
Office Action for U.S. Appl. No. 13/832,836, mailed Feb. 26, 2015, 9 pages.
Office Action for U.S. Appl. No. 14/543,489, mailed Feb. 12, 2016, 7 pages.
Office Action for U.S. Appl. No. 14/543,489, mailed Jul. 6, 2015, 9 pages.
Office Action for U.S. Appl. No. 14/926,760, mailed Feb. 25, 2019, 9 pages.
Office Action for U.S. Appl. No. 14/926,760, mailed Jun. 27, 2018, 10 pages.
Office Action for U.S. Appl. No. 14/932,153, mailed Aug. 7, 2018, 6 pages.
Office Action for U.S. Appl. No. 14/932,153, mailed Jan. 31, 2019, 7 pages.
Office Action for U.S. Appl. No. 15/185,625, mailed May 18, 2018, 9 pages.
Office Action for U.S. Appl. No. 15/185,625, mailed Nov. 2, 2017, 11 pages.
Office Action for U.S. Appl. No. 15/188,374, mailed Apr. 12, 2017, 9 pages.
Office Action for U.S. Appl. No. 15/724,701, mailed Apr. 4, 2019, 8 pages.
Office Action for U.S. Appl. No. 16/201,283, mailed Jun. 15, 2020, 13 pages.
Office Action for U.S. Appl. No. 16/705,949, mailed Dec. 9, 2020, 7 pages.
Office Action for U.S. Appl. No. 16/736,460, mailed Feb. 2, 2021, 13 pages.
Office Action for U.S. Appl. No. 17/402,059, filed Aug. 5, 2022, 6 pages.
Plitz, I. et al., "Structure and Electrochemistry of Carbon-Metal Fluoride Nanocomposites Fabricated by a Solid State Redox Conversion Reaction," Journal of The Electrochemical Society, Dec. 2004, 152(2), pp. A307-A315.
Reinhart et al., "Research and Demonstration Center for the Production of Large-Area Lithium-Ion Cells," Future Trends in Production Engineering, Jan. 1, 2012, pp. 3-12.
Rejection Decision for Chinese Application No. 201680004584.7, dated May 11, 2020, 17 pages.
Restriction Requirement for U.S. Appl. No. 17/169,862, dated Sep. 21, 2022, 9 pages.
Second Office Action for Chinese Application No. 201580057914.4, dated Dec. 12, 2019, 7 pages.
Second Office Action for Chinese Application No. 201680004584.7, dated Aug. 15, 2019, 27 pages.
Subsequent Substantive Examination Report for Philippines Patent Application No. 1-2017-500970, dated Dec. 6, 2019, 4 pages.
Subsequent Substantive Examination Report for Philippines Patent Application No. 1-2017-500970, dated Sep. 24, 2019, 10 pages.
Substantive Examination Adverse Report (Section 30(1) / 30(2)) and Search Report for Malaysian Application No. PI2017000573, mailed May 8, 2020, 4 pages.
Substantive Examination Adverse Report (Section 30(1) / 30(2)) and Search Report for Malaysian Application No. PI2017000885, mailed Jun. 18, 2020, 4 pages.
Substantive Examination Report (Restriction) for Philippines Patent Application No. 1-2017-500970, dated Mar. 14, 2019, 3 pages.
Third Office Action for Chinese Application No. 201580057914.4, dated Apr. 13, 2020, 21 pages.
Third Office Action for Chinese Application No. 201680004584.7, dated Jan. 3, 2020, 24 pages.
Decision of Rejection for Japanese Application No. 2017-517274, mailed Mar. 12, 2020, 8 pages.
Examination Report for Canadian Application No. 2,962,788, mailed Mar. 23, 2023, 3 pages.
Extended European Search Report for European Application No. 20153991.3, mailed Aug. 10, 2020, 6 pages.
Extended European Search Report for European Application No. EP23188734, mailed on Jan. 22, 2024, 8 pages.
First Office Action and Search Report for Chinese Application No. 202080081045 mailed Jul. 26, 2023, 20 pages.
Grant Notification for Indonesian Application No. P00201703544, mailed Apr. 5, 2023, with English Translation, 4 pages.
International Preliminary Report on Patentability for International Application No. PCT/US2022/048085 dated May 10, 2024, 11 pages.
International Search Report and Written Opinion for International Application No. PCT/US2015/054911, mailed Feb. 8, 2016, 10 pages.
International Search Report and Written Opinion for International Application No. PCT/US2023/071448 dated Nov. 17, 2023, 15 pages.
International Search Report and Written Opinion for PCT Application No. PCT/US2023/071439 dated Nov. 20, 2023, 9 pages.
Non-Final Office Action for U.S. Appl. No. 17/242,483 mailed on Apr. 26, 2023, 10 pages.

(56) References Cited

OTHER PUBLICATIONS

Non-Final Office Action for U.S. Appl. No. 18/107,695 dated Mar. 20, 2024, 13 pages.
Non-Final Office Action for U.S. Appl. No. 18/127,439 dated Nov. 21, 2023, 9 pages.
Non-Final Office Action for U.S. Appl. No. 18/510,473 mailed Jun. 21, 2024, 10 pages.
Notice of Allowance for Philippines Application No. PH20171500654 mailed Jul. 3, 2024, 2 pages.
Notice of Allowance for U.S. Appl. No. 17/140,281, mailed Oct. 13, 2022, 10 pages.
Notice of Allowance for U.S. Appl. No. 17/169,862, mailed Apr. 21, 2023, 8 pages.
Notice of Allowance for U.S. Appl. No. 17/402,059, mailed Jan. 19, 2023, 7 pages.
Notice of Allowance for U.S. Appl. No. 17/683,557 dated Nov. 1, 2023, 4 pages.
Notice of Allowance for U.S. Appl. No. 17/683,557 dated Oct. 12, 2023, 8 pages.
Notice of Allowance for U.S. Appl. No. 18/127,439 dated Apr. 19, 2024, 7 pages.
Notice of Allowance for U.S. Appl. No. 18/510,473 mailed Jul. 30, 2024, 8 pages.
Notice of Reasons for Rejection for Japanese Application No. 2017-517274, mailed Sep. 5, 2019, 11 pages.
Office Action and Search Report for Chinese Application No. 20211045727 dated Jul. 15, 2023, 19 pages.
Office Action and Search Report for Chinese Application No. CN202080081045 dated Nov. 9, 2023, 18 pages.
Office Action for Canadian Application No. 2,969, 135 dated Apr. 3, 2024, 5 pages.
Office Action for Canadian Application No. 2,969, 135 mailed Jul. 19, 2023, 5 pages.
Office Action for Chinese Application No. 202110490592 dated May 27, 2023, 17 pages.
Office Action for Chinese Application No. CN202080081045 mailed May 1, 2024, 12 pages.
Office Action for Chinese Application No. CN20211045727 dated Mar. 28, 2024, 12 pages.
Office Action for European Application No. 20153991.3, mailed Oct. 21, 2022, 4 pages.
Office Action for European Application No. EP20200153431 dated Oct. 23, 2023, 7 pages.
Office Action for Indian Application No. IN201717010973 dated Dec. 29, 2022, 2 pages.
Office Action for Indian Application No. IN201717010973 dated Feb. 27, 2023, 2 pages.
Office Action for Japanese Application No. 2020119675, mailed Jun. 15, 2022, 14 pages.
Office Action for Japanese Application No. 2020-119675, mailed Sep. 14, 2021, 24 pages.
Office Action for Japanese Application No. JP20210092052 dated May 21, 2024, 32 pages.
Office Action for Japanese Application No. JP2022099328 mailed May 8, 2023, 7 pages.
Office Action for Japanese Application No. JP2023071716 mailed Jun. 20, 2024, 10 pages.
Office Action for Korean Application No. 10-2023-7041858, dated Jan. 13, 2024, 6 pages.
Office Action for Korean Application No. 20177015132 dated May 30, 2023, 5 pages.
Office Action for U.S. Appl. No. 14/879,599, mailed Oct. 10, 2017, 9 pages.
Office Action for U.S. Appl. No. 16/789,158, mailed Jun. 25, 2020, 7 pages.
Office Action for U.S. Appl. No. 17/683,557, dated Mar. 28, 2023, 8 pages.
Substantive Examination Report for Philippines Application No. 1-2017-500654 dated Jul. 11, 2023, 5 pages.
Substantive Examination Report for Philippines Application No. 1-2017-500654 dated May 3, 2024, 4 pages.
Supplemental Notice of Allowance for U.S. Appl. No. 17/402,059 dated Feb. 23, 2023, 2 pages.

* cited by examiner

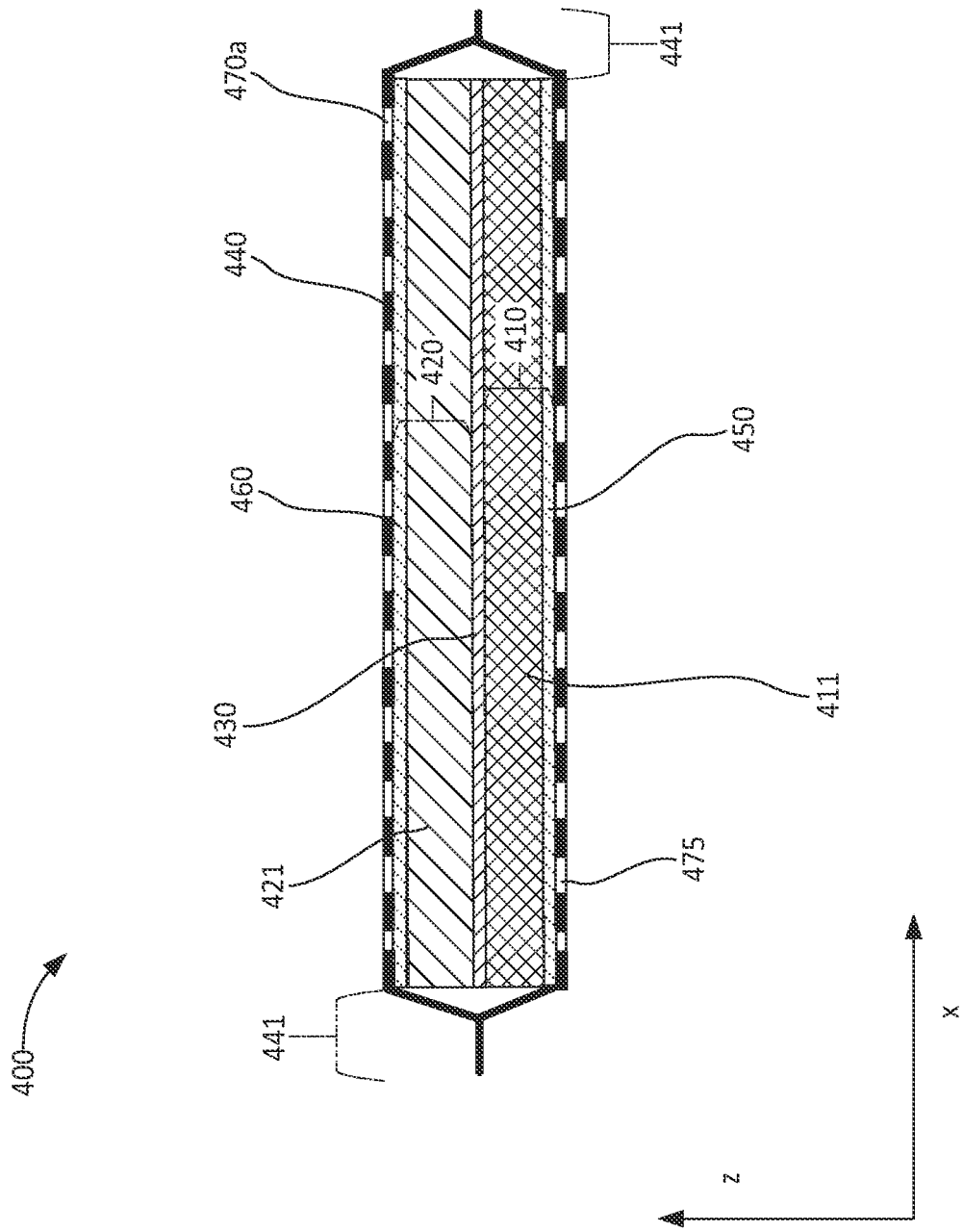

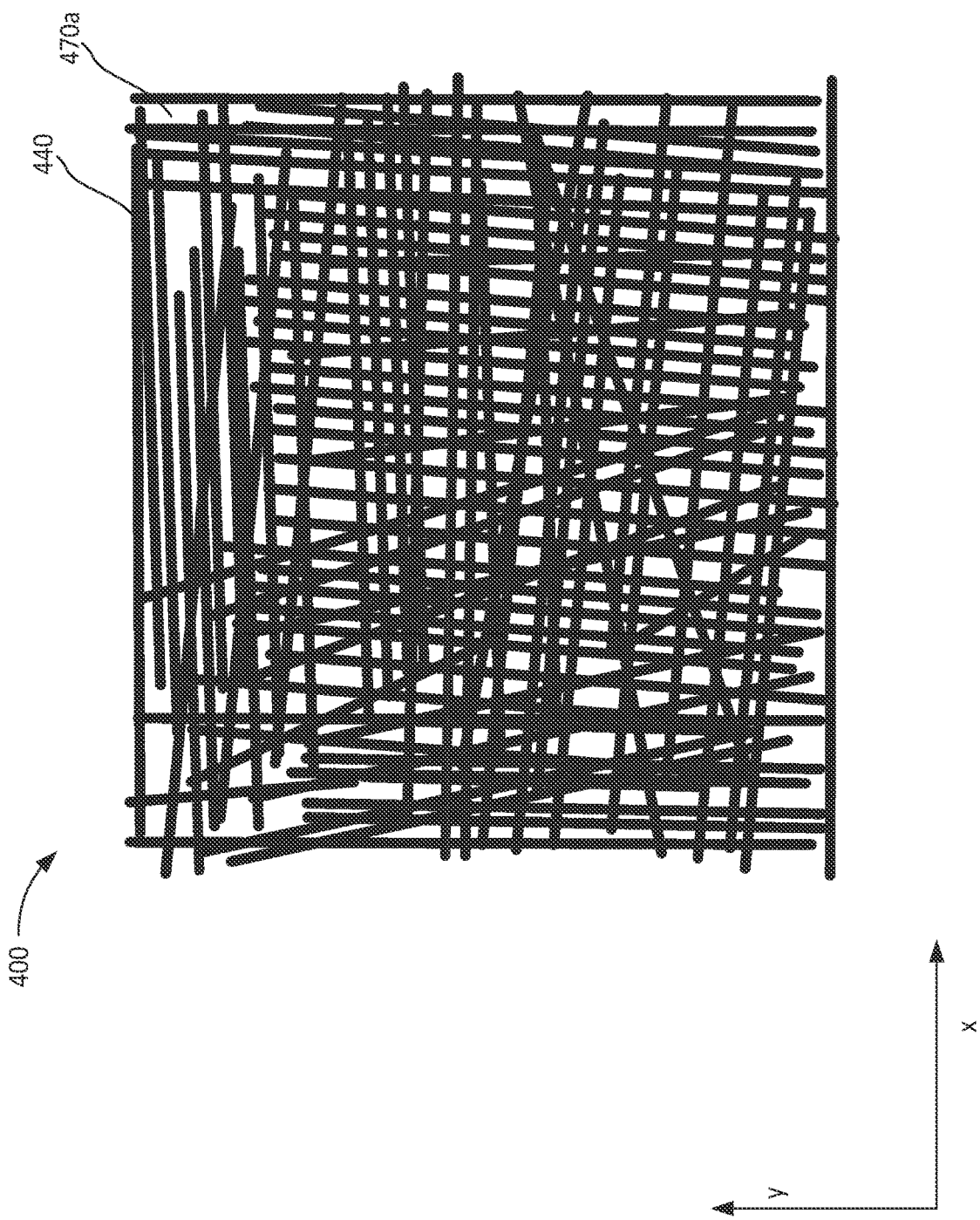

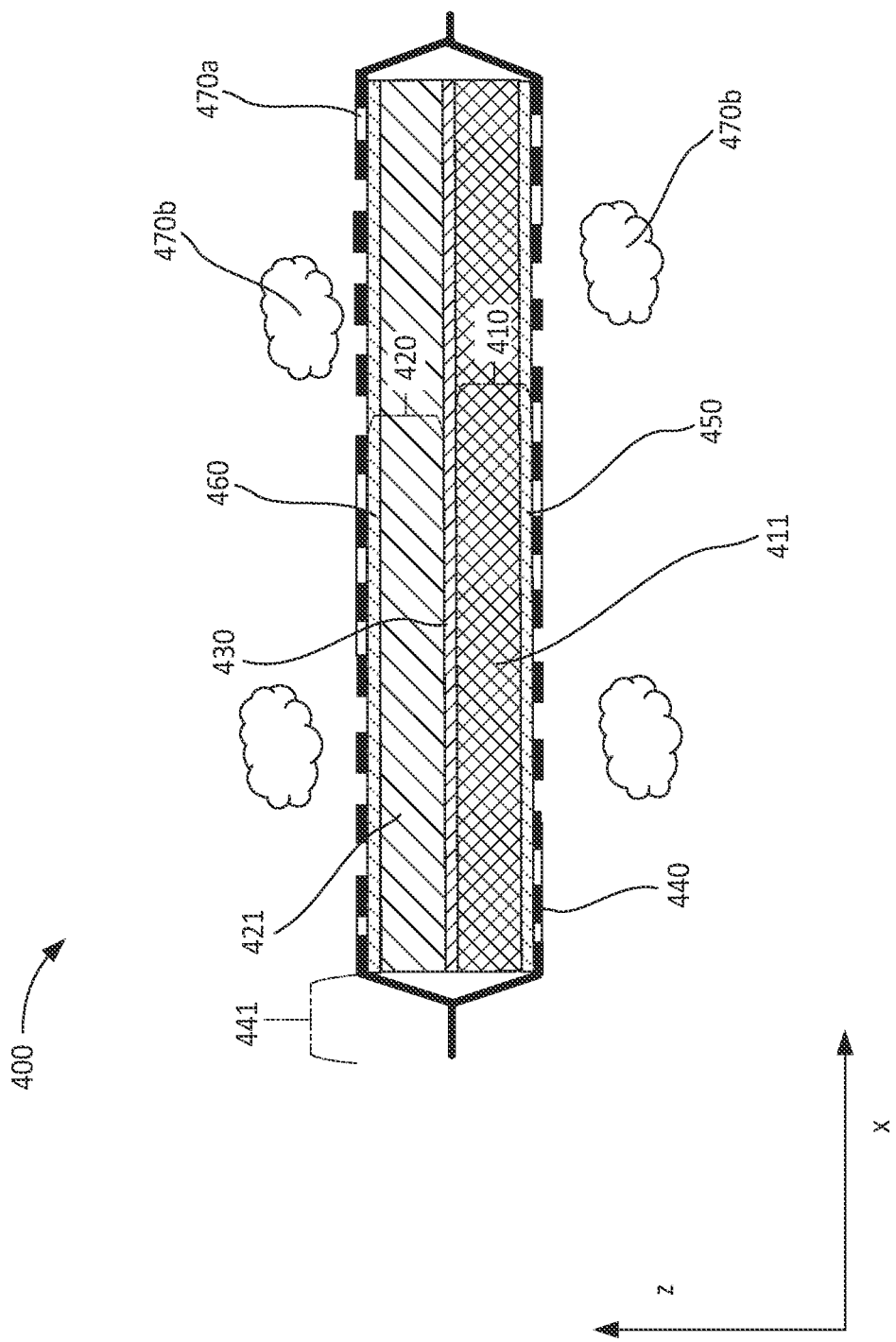

ELECTROCHEMICAL CELLS WITH FLAME RETARDANT MECHANISM AND METHODS OF PRODUCING THE SAME

CROSS-REFERENCE TO RELATED APPLICATIONS

This application claims priority and benefit of U.S. Provisional Application No. 63/040,154, filed Jun. 17, 2020 and entitled "Electrochemical Cells with Flame Retardant Mechanism and Methods of Producing the Same," the entire disclosure of which is hereby incorporated by reference herein in its entirety.

BACKGROUND

Embodiments described herein relate generally to the preparation of electrochemical cells and more particularly to systems and methods of preparing and using electrochemical cells with a flame retardant mechanism. Electrochemical cells often produce heat during cycling. Exothermic reactions can occur during charge and/or discharge across many cell chemistries. These exothermic reactions cause temperatures to rise to critical levels in various parts of the electrochemical cells, such that ignition can occur. In addition to cell cycling, processing of electrochemical cells can also lead to ignition events. For example, welding or brazing electrochemical cells or portions thereof can produce sparks and lead to ignition events. Incorporating flame retardant mechanisms into electrochemical cells can aid in preventing ignition and subsequent fires.

SUMMARY

Apparatus, systems, and methods described herein relate to the manufacture and use of electrochemical cells with a flame retardant mechanism. In some embodiments, an electrochemical cell includes a first current collector coupled to a first portion of a first pouch, the first current collector having a first electrode material disposed thereon. The electrochemical cell further includes a second current collector coupled to a second portion of the first pouch, the second current collector having a second electrode material disposed thereon. The electrochemical cell further includes a separator disposed between the first electrode material and the second electrode material, the first portion of the first pouch coupled to the second portion of the first pouch to enclose the electrochemical cell. The electrochemical cell further includes a flame retardant material coated to the first pouch and a second pouch, the second pouch enclosing the first pouch and the flame retardant material. In some embodiments, the flame retardant material can include a gas suppression precursor that produces a flame suppressing gas above a threshold temperature. In some embodiments, the gas suppression precursor can include urea, urea-formaldehyde resins, dicyandiamide, melamine, polyamide, cyanurate, melamine borate, melamine phosphate, melamine-poly (aluminum phosphate), $Li_2CO_3$, $NaHCO_3$, $PbCO_3$, and/or polycaprolactam.

BRIEF DESCRIPTION OF THE DRAWINGS

FIG. 4A shows a schematic view of an electrochemical cell with a flame retardant mechanism, according to an embodiment.

FIG. 4B shows a schematic view of an electrochemical cell with a flame retardant mechanism, according to an embodiment.

FIG. 4C shows a schematic view of an electrochemical cell with a flame retardant mechanism, according to an embodiment.

DETAILED DESCRIPTION

Figure 1:
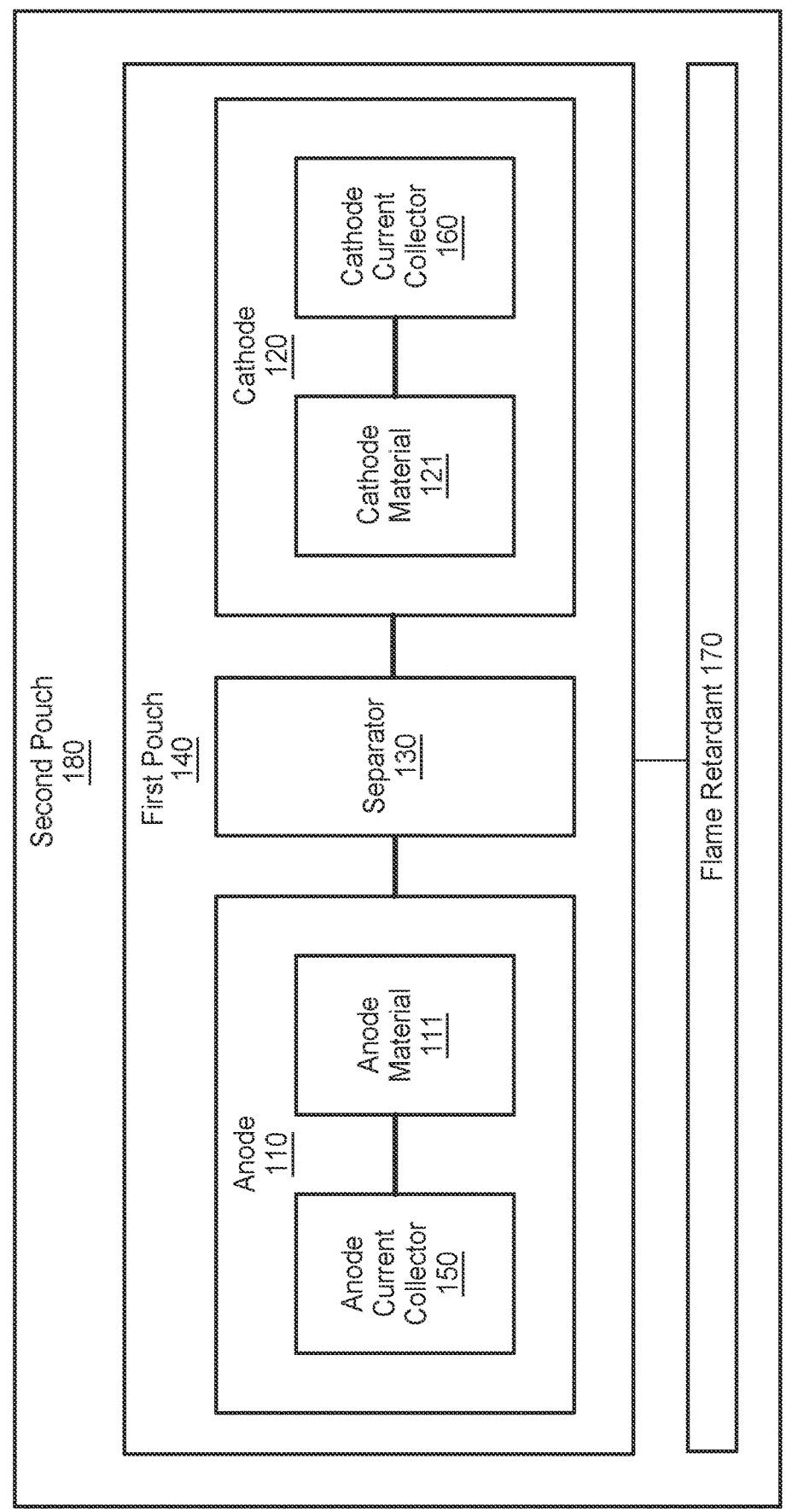
FIG. 1 is a schematic view of an electrochemical cell, according to an embodiment.

Heat generation in electrochemical cells or application of heat to electrochemical cells (directly or indirectly) can lead to ignition events. Materials in electrochemical cells (e.g., lithium metal, lithium-containing electrolytes) can be highly flammable. If multiple electrochemical cells are in close proximity to one another (e.g., in a shipping container or in a multicell system), chain reactions can occur, where the flame from a first electrochemical cell causes ignition in a second electrochemical cell, and the subsequent fire in the second electrochemical cell causes ignition in a third electrochemical cell, and so on. In some cases, ignition can be caused by a rise in temperature in the electrochemical cell (e.g., from cycling or from heat sources external to the electrochemical cell). In some cases, a spark (e.g., from a welding operation) can cause ignition in an electrochemical cell.

The use of flame retardant materials and/or flame preventing designs can aid in preventing catastrophic ignition events in electrochemical cells and electrochemical cell systems. In some embodiments, flame retardant mechanisms described herein can prevent or substantially prevent ignition events from occurring. In some embodiments, flame retardant mechanisms described herein can immediately extinguish flames upon ignition. In some embodiments, a flame retardant mechanism can smother a flame. In some embodiments, a flame retardant mechanism can starve a flame of oxygen. In some embodiments, a flame retardant material can be released to starve a flame of oxygen. In some embodiments, the released flame retardant material can include a flame retardant liquid. In some embodiments, the released flame retardant material can include a flame retardant gas. In some embodiments, the flame retardant material can include a flame retardant powder. In some embodiments, the flame retardant powder can include sodium bicarbonate.

In some embodiments, electrodes described herein can be semi-solid electrodes. In comparison to conventional electrodes, semi-solid electrodes can be made (i) thicker (e.g., greater than about 250 μm-up to about 2,000 μm or even greater) due to the reduced tortuosity and higher electronic conductivity of semi-solid electrodes, (ii) with higher loadings of active materials, (iii) with a simplified manufacturing process utilizing less equipment, and (iv) can be operated between a wide range of C-rates while maintaining a substantial portion of their theoretical charge capacity. These relatively thick semi-solid electrodes decrease the volume, mass and cost contributions of inactive components with respect to active components, thereby enhancing the commercial appeal of batteries made with the semi-solid electrodes. In some embodiments, the semi-solid electrodes described herein, are binderless and/or do not use binders that are used in conventional battery manufacturing. Instead, the volume of the electrode normally occupied by binders in conventional electrodes, is now occupied, by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes.

Since the semi-solid electrodes described herein can be made substantially thicker than conventional electrodes, the ratio of active materials (i.e., the semi-solid cathode and/or anode) to inactive materials (i.e. the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein. The use of semi-solid, binderless electrodes can also be beneficial in the incorporation of an overcharge protection mechanism, as generated gas can migrate to the electrode/current collector interface without binder particles inhibiting the movement of the gas within the electrode.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in a liquid electrolyte to produce a semi-solid electrode. Examples of electrochemical cells that include a semi-solid and/or binderless electrode material are described in U.S. Pat. No. 8,993,159 entitled, "Semi-solid Electrodes Having High Rate Capability," filed Apr. 29, 2013 ("the '159 patent"), the disclosure of which is incorporated herein by reference in its entirety.

As used herein, the term "single pouch electrochemical cell" refers to an electrochemical cell (also referred to herein as "electrochemical cell") including a pouch typically containing one unit cell assembly, which further includes one anode, one cathode, and one separator. In some cases, as explicitly stated in the specification, a single pouch electrochemical cell can contain two unit cell assemblies.

As used in this specification, the terms "about" and "approximately" generally include plus or minus 10% of the value stated. For example, about 5 would include 4.5 to 5.5, approximately 10 would include 9 to 11, and about 100 would include 90 to 110.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

FIG. 1 shows a schematic view of an electrochemical cell 100 with a flame retardant mechanism, according to an embodiment. The electrochemical cell 100 includes an anode 110, which includes anode material 111 disposed on an anode current collector 150 (also referred to herein as "ACC 150"), a cathode 120, which includes cathode material 121 disposed on a cathode current collector 160 (also referred to herein as "CCC 160"), and a separator 130 disposed between the anode 110 and the cathode 120. The assembly of the anode 110, the cathode 120, and the separator 130 is contained substantially in a first pouch 140, which can separate the electrochemical cell 100 from adjacent cell(s) in a battery module or pack, thereby mitigating defect propagation (e.g., fire hazard) by limiting unintended electrochemical reactions to within individual cells. The first pouch 140 is coupled to a flame retardant 170 and disposed inside a second pouch 180. Optionally, the ACC 150 and the CCC 160 can be disposed on the inside of the first pouch 140 prior to assembling the anode 110, the cathode 120 or the electrochemical cell 100. The use of a pouch can also reduce or eliminate metal contamination in the electrodes during a welding process in the construction of a battery module/pack since the electrodes (i.e., the anode 110 and the cathode 120) are protected by the first pouch 140 from metal particles or any other materials that can potentially short-circuit the electrochemical cells. Optionally, in some embodiments, at least one of the ACC 150 and CCC 160 can include a tab or tab connection (not shown) that acts as an electrical lead (or connecting point) to connect to one or more external electrical circuits.

In some embodiments, the flame retardant 170 can include a mechanism that releases gas to smother a flame. In some embodiments, the flame retardant 170 can include a mechanism that releases liquid to smother a flame In some embodiments, the flame retardant 170 can be disposed in a third pouch (not shown), the third pouch disposed outside of the first pouch 140 and inside the second pouch 180.

In some embodiments, the flame retardant 170 can include a material disposed on the outside of the first pouch 140 that releases a flame-smothering gas above a threshold temperature. In some embodiments, the flame retardant 170 can include a gas suppression precursor material. In some embodiments, the flame retardant 170 can include a spumific agent such as urea, urea-formaldehyde resins, dicyandiamide, melamine, polyamide, $Li_2CO_3$, $NaHCO_3$, $PbCO_3$, or any combination thereof. Examples include but are not limited to melamine cyanurate, melamine borate, melamine phosphate, melamine polyphosphate, melamine-poly(aluminum phosphate), or polycaprolactam. In some embodiments, the flame retardant 170 can include halogenated flame retardants such as organochlorines, organobromines, chlorinated paraffins, or any combination thereof. Examples include but are not limited to hexabromocyclododecane, decabromodiphenyl ether, tetrabromophthalic anyhydrid, tetrabromobisphenol A (TBBPA), hexachlorocyclopentadiene, tetrachlorphthalic anhydride, chlorendic acid, polybrominated biphenyl (BB), polybrominated diphenyl ether (PBDE), hexabromocyclododecane (HBCD), 2,4,6-tribromophenol (TBP), or any combination thereof. In some embodiments, halogenated flame retardants may be used in conjunction with a synergist such as antimony trioxide, molybdenum trioxide, sodium antimonate, barium metaborate, ammonium fluoroborate. In some embodiments, the flame retardant 170 can include organophosphorous compounds such as triphenyl phosphate, esorcinol bis(diphenylphosphate), dimethyl methylphosphonate, or aluminium diethyl phosphinate. In some embodiments, the flame retardant 170 can include metal hydroxides such as aluminum trihydroxide, magnesium hydroxide, calcium hydroxide, potassium hydroxide, lithium hydroxide, or any combination thereof. In some embodiments, the flame retardant can be a gel such as water containing a thickening agent such as sodium carboxymethylcellulose, sodium alginate, or calcium alginate with calcium chloride. In some embodiments, the flame retardant 170 can produce a flame-smothering foam above a threshold temperature.

In some embodiments, the flame retardant 170 can release a flame-suppressing gas and/or produce a flame-smothering foam above a threshold temperature of at least about 75° C., at least about 100° C., at least about 125° C., at least about 150° C., at least about 175° C., at least about 200° C., at least about 210° C., at least about 225° C., at least about 250° C., at least about 275° C., at least about 300° C., at least about 325° C., at least about 350° C., at least about 400° C., at least about 450° C., at least about 500° C., at least about 550° C., at least about 600° C., at least about 650° C., at least about 700° C., at least about 730° C., at least about 750° C., at least about 800° C., at least about 850° C., at least about 900° C., at least about 950° C., at least about 1,000° C., at least about 1,050° C., at least about 1,100° C., at least about 1,150° C., at least about 1,200° C., at least about 1,250° C., at least about 1,270° C., at least about 1,300° C., or at least about 1,350° C. In some embodiments, the flame retardant 170 can release a flame-suppressing gas and/or produce a flame-smothering foam above a threshold temperature of no more than about 1,400° C., no more than about 1,350° C., no more than about 1,300° C., no more than about 1,270° C., no more than about 1,250° C., no more than about 1,200° C., no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 730° C., no more than about 700° C., no more than about 650° C., no more than about 600° C., no more than about 550° C., no more than about 500° C., no more than about 450° C., no more than about 400° C., no more than about 350° C., no more than about 325° C., no more than about 300° C., no more than about 275° C., no more than about 250° C., no more than about 225° C., no more than about 210° C., no more than about 200° C., no more than about 175° C., no more than about 150° C., no more than about 125° C., or no more than about 100° C.

Combinations of the above-referenced temperatures, above which the flame retardant 170 releases a flame-suppressing gas and/or produces a flame-smothering foam are also possible (e.g., at least about 75° C. and no more than about 1,400° C. or at least about 730° C. and no more than about 1,270° C.), inclusive of all values and ranges therebetween. In some embodiments, the flame retardant 170 can release a flame-suppressing gas and/or produce a flame-smothering foam above a threshold temperature of about 75° C., about 100° C., about 125° C., about 150° C., about 175° C., about 200° C., about 210° C., about 225° C., about 250° C., about 275° C., about 300° C., about 325° C., about 350° C., about 400° C., about 450° C., about 500° C., about 550° C., about 600° C., about 650° C., about 700° C., about 730° C., about 750° C., about 800° C., about 850° C., about 900° C., about 950° C., about 1,000° C., about 1,050° C., about 1,150° C., about 1,200° C., about 1,250° C., about 1,270° C., about 1,300° C., about 1,350° C., or about 1,400° C.

In some embodiments, the flame retardant 170 can include a liquid. In some embodiments, the liquid can be disposed in a container that opens when the container surpasses a threshold temperature. For example, the container can include a thin polymer, and when the thin polymer begins to melt, the liquid exits and smothers any flame that has ignited. In some embodiments, the flame retardant 170 can include a liquid disposed between the first pouch 140 and the second pouch 180. In other words, the flame retardant 170 can be a liquid disposed on the outside of the first pouch 140 and inside the second pouch 180. In some embodiments, the flame retardant 170 can be a solid that melts above a threshold temperature and becomes a liquid that smothers a flame. In some embodiments, the flame retardant 170 can include organophosphates such as Isopropyl Phenyl Diphenyl Phosphate (IPPP), Diphenyloctyl phosphate (DPOF), Triphenyl Phosphate (TPP), Dimethyl methylphosphonate (DMMP), Triethyl Phosphate (TEP), Trimethyl Phosphate (TMP), or any combination thereof. In some embodiments the flame retardant can include ionic liquids such as 1-vinyl-3-(diethoxyphosphoryl)-propylimidazolium bromide, 1-Ethyl-3-methylimidazolium chloride, 1-ethyl-3-methylimidazolium bromide, 1-ethyl-3-methylimidazolium methylphosphonate, 1-ethyl-3-methylimidazolium tetrafluoroborate, 1-ethyl-3-methylimidazolium hexafluorophosphate, 3-hexyl-1-methyl-1-H-imidazol-3-ium bromide, or any combination thereof.

In some embodiments, the flame retardant 170 can include a solid. In some embodiments, the flame retardant 170 can include a flame retardant powder. In some embodiments, the flame retardant powder can include sodium bicarbonate. In some embodiments, the flame retardant powder can be mixed with a binder. In some embodiments, the flame retardant powder can be coated on an interior surface of the second pouch 180. In some embodiments, the binder can facilitate coating of the flame retardant powder onto the interior surface of the second pouch 180. In some embodiments, the flame retardant powder can be coated on an exterior surface of the first pouch 140. In some embodiments, the flame retardant powder can be disposed in a third pouch (not shown), the third pouch outside of the first pouch 140 and inside the second pouch 180.

In some embodiments, the flame retardant 170 can melt above a threshold temperature of at least about 75° C., at least about 100° C., at least about 125° C., at least about 150° C., at least about 175° C., at least about 200° C., at least about 210° C., at least about 225° C., at least about 250° C., at least about 275° C., at least about 300° C., at least about 325° C., at least about 350° C., at least about 400° C., at least about 450° C., at least about 500° C., at least about 550° C., at least about 600° C., at least about 650° C., at least about 700° C., at least about 730° C., at least about 750° C., at least about 800° C., at least about 850° C., at least about 900° C., at least about 950° C., at least about 1,000° C., at least about 1,050° C., at least about 1,150° C., at least about 1,200° C., at least about 1,250° C., at least about 1,270° C., at least about 1,300° C., or at least about 1,350° C. In some embodiments, the flame retardant 170 can melt above a threshold temperature of no more than about 1,400° C., no more than about 1,350° C., no more than about 1,300° C., no more than about 1,270° C., no more than about 1,250° C., no more than about 1,200° C., no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 730° C., no more than about 700° C., no more than about 650° C., no more than about 600° C., no more than about 550° C., no more than about 500° C., no more than about 450° C., no more than about 400° C., no more than about 350° C., no more than about 325° C., no more than about 300° C., no more than about 275° C., no more than about 250° C., no more than about 225° C., no more than about 210° C., no more than about 200° C., no more than about 175° C., no more than about 150° C., no more than about 125° C., or no more than about 100° C. Combinations of the above-referenced temperatures, above which the flame retardant 170 melts are also possible (e.g., at least about 75° C. and no more than about 1,400° C. or at least about 730° C. and no more than about 1,270° C.), inclusive of all values and ranges therebetween. In some embodiments, the flame retardant 170 can melt above a threshold temperature of about 75° C., about 100° C., about 125° C., about 150° C., about 175° C., about 200° C., about 210° C., about 225° C., about 250° C., about 275° C., about 300° C., about 325° C., about 350° C., about 400° C., about 450° C., about 500° C., about 550° C., about 600° C., about 650° C., about 700° C., about 730° C., about 750° C., about 800° C., about 850° C., about 900° C., about 950° C., about 1,000° C., about 1,050° C., about 1,150° C., about 1,200° C., about 1,250° C., about 1,270° C., about 1,300° C., about 1,350° C., or about 1,400° C.

In some embodiments, the flame retardant material 170 can coat at least a portion of the first pouch 140. In some embodiments, the flame retardant material 170 can coat only one side (e.g., a top side or a bottom side) of the first pouch 140. In some embodiments, the flame retardant material 170 can coat a top side and a bottom side of the first pouch 140. In some embodiments, the flame retardant material 170 can coat at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99% of the outside surface area of the first pouch 140. In some embodiments, the flame retardant material 170 can coat no more than about 100%, no more than about 99%, no more than about 98%, no more than about 97%, no more than about 96%, no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, no more than about 10%, no more than about 9%, no more than about 8%, no more than about 7%, no more than about 6%, no more than about 5%, no more than about 4%, no more than about 3%, or no more than about 2% of the outside surface area of the first pouch 140. Combinations of the above-referenced percentages of the outside surface area of the first pouch 140 coated by the flame retardant 170 are also possible (e.g., at least about 1% and no more than about 100% or at least about 10% and no more than about 50%), inclusive of all values and ranges therebetween. In some embodiments, the flame retardant material 170 can coat about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% of the outside surface area of the first pouch 140.

In some embodiments, the flame retardant 170 can be infused into the first pouch 140. For example, the first pouch 140 can have pores and the pores can be infused with the flame retardant 170. In some embodiments, the first pouch 140 can have pores with an average diameter of at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 300 nm, at least about 400 nm, at least about 500 nm, at least about 600 nm, at least about 700 nm, at least about 800 nm, at least about 900 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 µm, at least about 40 µm, at least about 50 µm, at least about 60 µm, at least about 70 µm, at least about 80 µm, at least about 90 µm, at least about 100 µm, at least about 200 µm, at least about 300 µm, at least about 400 µm, at least about 500 µm, at least about 600 µm, at least about 700 µm, at least about 800 µm, or at least about 900 µm. In some embodiments, the first pouch 140 can have pores with an average diameter of no more than about 1 mm, no more than about 900 µm, no more than about 800 µm, no more than about 700 µm, no more than about 600 µm, no more than about 500 µm, no more than about 400 µm, no more than about 300 µm, no more than about 200 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, no more than about 1 µm, no more than about 900 nm, no more than about 800 nm, no more than about 700 nm, no more than about 600 nm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, or no more than about 30 nm.

Combinations of the above-referenced average pore diameters in the first pouch 140 are also possible (e.g. at least about 20 nm and no more than about 1 mm or at least about 10 µm and no more than about 100 µm), inclusive of all values and ranges therebetween. In some embodiments, the first pouch 140 can have pores with an average diameter of about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 200 µm, about 300 µm, about 400 µm, about 500 µm, about 600 µm, about 700 µm, about 800 µm, about 900 µm, or about 1 mm.

In some embodiments, the first pouch 140 can include a network of fibers. In some embodiments, the first pouch 140 can have a porosity of at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, or at least about 45%. In some embodiments, the first pouch 140 can have a porosity of no more than about 50%, no more than about 45%, no more than about 40%, no more than about 35%, no more than about 30%, no more than about 25%, no more than about 20%, no more than about 15%, no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, or no more than about 0.2%. Combinations of the above-referenced porosities are also possible (e.g., at least about 0.1% and no more than about 50% or at least about 10% and no more than about 40%), inclusive of all values and ranges therebetween. In some embodiments, the first pouch 140 can have a porosity of about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 15%, about 20%, about 25%, about 30%, about 35%, about 40%, about 45%, or about 50%. In some embodiments, the first pouch 140 can be nonporous or substantially nonporous.

In some embodiments, the ACC 150 and CCC 160 (collectively referred to herein as the "current collector") can include a conductive material in the form of a substrate, sheet or foil, or any other form factor. In some embodiments, the current collector can include a metal such as aluminum, copper, lithium, nickel, stainless steel, tantalum, titanium, tungsten, vanadium, or a mixture, combinations or alloys thereof. In other embodiments, the current collector can include a non-metal material such as carbon, carbon nanotubes, or a metal oxide (e.g., TiN, $TiB_2$, $MoSi_2$, n-$BaTiO_3$, $Ti_2O_3$, $ReO_3$, $RuO_2$, $IrO_2$, etc.). In some embodiments, the current collector can include a conductive coating disposed on any of the aforementioned metal and non-metal materials. In some embodiments, the conductive coating can include a carbon-based material, conductive metal and/or non-metal material, including composites or layered materials.

In some embodiments, the current collector includes a base substrate having one or more surface coatings so as to improve the mechanical, thermal, chemical, or electrical properties of the current collector. In one example, the coating(s) on the current collector can be configured to reduce corrosion and alter adhesion characteristics (e.g., hydrophilic or hydrophobic coatings, respectively). In another example, the coating(s) on the current collector can comprise a material of high electrical conductivity to improve the overall charge transport of the base substrate. In yet another example, the coatings can comprise a material of high thermal conductivity to facilitate heat dissipation of the base substrate and protect the battery from overheating. In yet another example, the coatings can comprise a heat-resistant or fire-retardant material to prevent the battery from fire hazards. In yet another example, the coatings can be configured to be rough so as to increase the surface area and/or the adhesion with the electrode material (e.g., anode material 111 and cathode material 121). In yet another example, the coatings can include a material with good adhering or gluing properties with the electrode material.

In some embodiments, the current collector includes a conductive substrate, sheet or foil having a roughened surface so as to improve the mechanical, electrical, and thermal contact between the electrode material and the current collector. The roughened surface of the current collector can increase the physical contact area between the electrode material and the current collector, thereby increasing the adherence of the electrode material to the current collector. The increased physical contact area can also improve the electrical and thermal contact (e.g., reduced electrical and thermal resistance) between the current collector and the electrode material.

In some embodiments, the current collector includes a porous current collector such as a wire mesh. The wire mesh (also referred to herein as mesh) can include any number of filament wires that can be assembled in various configurations using suitable processes, such as a regular pattern or structure produced by weaving, braiding, knitting, etc. or a more random pattern or structure produced by randomly distributing wires and joining them by welding, adhesives, or other suitable techniques. Moreover, the wires comprising the mesh can be any suitable material. For example, in some embodiments, the wires are metallic such as, steel, aluminum, copper, titanium or any other suitable metal. In other embodiments, the wires can be a conductive non-metallic material such as, for example, carbon nanofiber or any other suitable material. In some embodiments, the wires can include coatings. For example, the coatings can be configured to reduce corrosion and enhance or reduce adhesion characteristics (e.g., hydrophilic or hydrophobic coatings, respectively). Examples of porous current collectors are described in U.S. Pat. No. 9,825,280 ("the '280 patent), entitled "Semi-Solid Electrode Cell Having A Porous Current Collector and Methods of Manufacture," and U.S. Pat. No. 10,115,970, ("the '970 patent") entitled "Semi-Solid Electrodes with Porous Current Collectors and Methods of Manufacture," the entire disclosures of which are hereby incorporated by reference herein. Examples of electrochemical cells disposed in a pouch are described in U.S. Pat. No. 10,181,587 ("the '587 patent"), entitled "Single Pouch Battery Cells and Methods of Manufacture," the entire disclosure of which is hereby incorporated by reference herein.

In some embodiments, the current collector can be produced via any of the following coating or deposition techniques including, but not limited to, chemical vapor deposition (CVD) (including initiated CVD, hot-wire CVD, plasma enhanced CVD, and other forms of CVD), physical vapor deposition, sputter deposition, magnetron sputtering, radio frequency sputtering, atomic layer deposition, pulsed laser deposition, plating, electroplating, dip-coating, brushing, spray-coating, sol-gel chemistry (through dip-coating, brushing or spray-coating), electrostatic spray coating, 3D printing, spin coating, electrodeposition, powder coating, sintering, self-assembly methods, and any combination of the techniques thereof.

In some embodiments, the properties the deposited or coated current collector can be optimized during the deposition by varying deposition parameters. Physical properties such as, for example, coating texture, coating thickness, thickness uniformity, surface morphology, including surface roughness, porosity and general mechanical properties, including fracture toughness, ductility, and tensile strength can be optimized via fine tuning of deposition parameters. Similarly, chemical properties such as, for example, chemical resistance and corrosion resistance to electrolyte and salts, along with other chemical properties, including specific reactivity, adhesion, affinity, and the like can be optimized by varying deposition parameters to produce a functioning current collector. In some embodiments, various physical and chemical properties of the deposited or coated current collector can be further improved or modified post deposition by a subsequent surface or temperature treatment, such as annealing or rapid-thermal (flash) annealing, or electromechanical polishing, and using any combination of the techniques thereof.

In some embodiments, the anode current collector 150 can have a thickness in a range of about 1 µm to about 20 µm. In some embodiments, the anode current collector 150 can have a thickness in a range of about 1 µm to about 18 µm. In some embodiments, the anode current collector 150 can have a thickness in a range of about 1 µm to about 17 µm. In some embodiments, the anode current collector 150 can have a thickness in a range of about 1 µm to about 16 µm. In some embodiments, the anode current collector 150 can have a thickness in a range of about 1 µm to about 15 µm. In some embodiments, the anode current collector 150 can have a thickness in a range of about 1 µm to about 14 µm. In some embodiments, the anode current collector 150 can have a thickness in a range of about 1 µm to about 13 µm. In some embodiments, the anode current collector 150 can have a thickness in a range of about 1 µm to about 12 µm. In some embodiments, the anode current collector 150 can have a thickness in a range of about 2 µm to about 11 µm. In some embodiments, the anode current collector 150 can have a thickness in a range of about 3 µm to about 10 µm. In some embodiments, the anode current collector 150 can have a thickness in a range of about 4 µm to about 9 µm. In some embodiments, the anode current collector 150 can have a thickness in a range of about 5 µm to about 8 µm. In some embodiments, the anode current collector 150 can have a thickness in a range of about 6 µm to about 7 µm. In some embodiments, the anode current collector 150 can have a thickness less than about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, and about 20 µm, inclusive of all thicknesses therebetween.

The anode material 111 can be selected from a variety of materials. In some embodiments, the anode material 111 comprises a carbon-based material, including, but are not limited to, hard carbon, carbon nanotubes, carbon nanofibers, porous carbon, and graphene. In some embodiments, the anode material 111 comprises a titanium-based oxide including, but are not limited to, spinel $Li_4Ti_5O_{12}$ (LTO) and titanium dioxide ($TiO_2$, Titania). In some embodiments, the anode material 111 comprises alloy or de-alloy material including, but are not limited to, silicon, silicon monoxide (SiO), germanium, and tin oxide ($SnO_2$). In some embodiments, the anode material 111 comprises a transition metal compound (e.g., oxides, phosphides, sulphides and nitrides). The general formula of a transition compound can be written as $M_xN_y$, where M can be selected from iron (Fe), cobalt (Co), copper (Cu), manganese (Mn), and nickel (Ni), and N can be selected from oxygen (O), phosphorous (P), sulfur (S), and nitrogen (N).

In some embodiments, the anode material 111 can include a solid selected from the group consisting of amorphous carbon, disordered carbon, graphitic carbon, or a metal-coated or metal-decorated carbon, graphite, non-graphitic carbon, mesocarbon microbeads, boron-carbon alloys, hard or disordered carbon, lithium titanate spinel, or a solid metal or metal alloy or metalloid or metalloid alloy that reacts with lithium to form intermetallic compounds, e.g., Si, Ge, Sn, Bi, Zn, Ag, Al, any other suitable metal alloy, metalloid alloy or combination thereof, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}S_{17}$, $Li_{21}S_{18}$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions, any other materials or alloys thereof, or any other combination thereof.

In some embodiments, the anode material 111 comprises an intermetallic compound. An intermetallic compound can be based on a formulation MM', wherein M is one metal element and M' is a different metal element. An intermetallic compound can also include more than two metal elements. The M atoms of an intermetallic compound can be, for example, Cu, Li, and Mn, and the M' element of an intermetallic compound can be, for example, Sb. Exemplary intermetallic compounds include $Cu_2Sb$, $Li_2CuSb$, and $Li_3Sb$, among others. In one example, the intermetallic compound in the anode material 111 can have fully disordered structures in which the M or M' atoms are arranged in a random manner. In another example, the intermetallic compound in the anode material 111 has partially disordered structures in which the M or M' atoms in the crystal lattice are arranged in a non-random manner.

In some embodiments, the anode material 111 can be porous so as to increase the surface area and enhance the rate of lithium intercalation in the resulting electrodes. In one example, the anode material 111 includes porous $Mn_2O_3$, which can be prepared by, for example, thermal decomposition of $MnCO_3$ microspheres. In another example, the anode material 111 includes porous carbon fibers prepared by, for example, electrospinning a blend solution of polyacrylonitrile and poly(l-lactide), followed by carbonization. In some embodiments, the porosity of the anode material 111 can be achieved or increased by using a porous current collector. For example, the anode material 111 can include $Cu_2Sb$, which is deposited conformally on a porous foam structure, to have certain degree of porosity.

In some embodiments, the thickness of the anode material 111 can be in the range of about 250 µm to about 2,000 µm, about 300 µm to about 2,000 µm, about 350 µm to about 2,000 µm, 400 µm to about 2,000 µm, about 450 µm to about 2,000 µm, about 500 to about 2,000 µm, about 250 µm to about 1,500 µm, about 300 µm to about 1,500 µm, about 350 µm to about 1,500 µm, about 400 µm to about 1,500 µm, about 450 µm to about 1,500 µm, about 500 to about 1,500 µm, about 250 µm to about 1,000 µm, about 300 µm to about 1,000 µm, about 350 µm to about 1,000 µm, about 400 µm to about 1,000 µm, about 450 µm to about 1,000 µm, about 500 µm to about 1,000 µm, about 250 µm to about 750 µm, about 300 µm to about 750 µm, about 350 µm to about 750 µm, about 400 µm to about 750 µm, about 450 µm to about 750 µm, about 500 µm to about 750 µm, about 250 µm to about 700 µm, about 300 µm to about 700 µm, about 350 µm to about 700 µm, about 400 µm to about 700 µm, about 450 µm to about 700 µm, about 500 µm to about 700 µm, about 250 µm to about 650 µm, about 300 µm to about 650 µm, about 350 µm to about 650 µm, about 400 µm to about 650 µm, about 450 µm to about 650 µm, about 500 µm to about 650 µm, about 250 µm to about 600 µm, about 300 µm to about 600 µm, about 350 µm to about 600 µm, about 400 µm to about 600 µm, about 450 µm to about 600 µm, about 500 µm to about 600 µm, about 250 µm to about 550 µm, about 300 µm to about 550 µm, about 350 µm to about 550 µm, about 400 µm to about 550 µm, about 450 µm to about 550 µm, or about 500 µm to about 550 µm, inclusive of all ranges or any other distance therebetween.

In some embodiments, the cathode 120 includes a cathode current collector 160 and a cathode material 121. The cathode current collector 160 in the cathode 120 can be substantially the same as the anode current collector 150 in the anode 110 as described above, and hence the same techniques as described with respect to deposition and/or coating techniques of anode current collector 150 can also be applicable in production of a cathode current collector 160. In some embodiments, the cathode current collector 160 can have a thickness in a range of about 1 µm to about 40 µm. In some embodiments, the CCC 160 can have a thickness in a range of about 2 µm to about 38 µm. In some embodiments, the CCC 160 can have a thickness in a range of about 2 µm to about 36 µm. In some embodiments, the CCC 160 can have a thickness in a range of about 2 µm to about 34 µm. In some embodiments, the CCC 160 can have a thickness in a range of about 2 µm to about 32 µm. In some embodiments, the CCC 160 can have a thickness in a range of about 2 µm to about 30 µm. In some embodiments, the CCC 160 can have a thickness in a range of about 2 µm to about 28 µm. In some embodiments, the CCC 160 can have a thickness in a range of about 2 µm to about 26 µm. In some embodiments, the CCC 160 can have a thickness in a range of about 2 µm to about 24 µm. In some embodiments, the CCC 160 can have a thickness in a range of about 2 µm to about 22 µm. In some embodiments, the CCC 160 can have a thickness in a range of about 2 µm to about 20 µm. In some embodiments, the CCC 160 can have a thickness in a range of about 2 µm to about 18 µm. In some embodiments, the CCC 160 can have a thickness in a range of about 3 µm to about 16 µm. In some embodiments, the CCC 160 can have a thickness in a range of about 4 µm to about 14 µm. In some embodiments, the CCC 160 can have a thickness in a range of about 5 µm to about 12 µm. In some embodiments, the CCC 160 can have a thickness in a range of about 6 µm to about 10 µm. In some embodiments, the CCC 160 can have a thickness in a range of about 7 µm to about 8 µm. In some embodiments, the CCC 160 can have a thickness less than about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, about 21 µm, about 22 µm, about 23 µm, about 24 µm, about 25 µm, about 26 µm, about 27 µm, about 28 µm, about 29 µm, about 30 µm, about 31 µm, about 32 µm, about 33 µm, about 34 µm, about 35 µm, about 36 µm, about 27 µm, about 38 µm, about 39 µm, and about 40 µm, inclusive of all thicknesses therebetween.

The cathode material 121 in the cathode 120 can be, for example, Nickel Cobalt Aluminum (NCA), Core Shell Gradient (CSG), Spinel-based lithium-ion (LMO), Lithium Iron Phosphate (LFP), Cobalt-based lithium-ion (LCO) and Nickel Cobalt Manganese (NCM). In some embodiments, the cathode material 121 can include solid compounds known to those skilled in the art as those used in Nickel-metal Hydride (NiMH) and Nickel Cadmium (NiCd) batteries. In some embodiments, the cathode material 121 can include the general family of ordered rocksalt compounds $LiMO_2$ including those having the α-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, $Li(Ni, Co, Al)O_2$ (known as "NCA") and $Li(Ni, Mn, Co)O_2$ (known as "NMC" or "NCM"). Other families of exemplary cathode material 121 can include those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds, such as $LiVPO_4F$, other "polyanion" compounds as described below, and vanadium oxides $V_xO_y$ including $V_2O_5$ and $V_6O_{11}$.

In some embodiments, the cathode material 121 comprises a transition metal polyanion compound, for example as described in U.S. Pat. No. 7,338,734. In some embodiments, the cathode material 121 comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1-a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)z(A_{1-a}M''_a)_x$ $M'_y(X_2D_7)_z$ and have values such that (1-a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The cathode material 121 can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the cathode material 121 comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant, such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15-0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments, the cathode material 121 comprises a metal salt that stores an alkali ion by undergoing a displacement or conversion reaction. Examples of such compounds include metal oxides, such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides, such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments, the cathode material 121 comprises carbon monofluoride or its derivatives. In some embodiments, the cathode material 121 undergoing displacement or conversion reaction is in the form of particulates having on average dimensions of 100 nanometers or less. In some embodiments, the cathode material 121 undergoing displacement or conversion reaction comprises a nanocomposite of the cathode material 121 mixed with an inactive host, including but not limited to conductive and relatively ductile compounds such as carbon, or a metal, or a metal sulfide. $FeS_2$ and $FeF_3$ can also be used as cheap and electronically conductive cathode materials 121 in a nonaqueous or aqueous lithium system. In some embodiments, a $CF_x$ electrode, $FeS_2$ electrode, or $MnO_2$ electrode is a positive cathode material used with a lithium metal negative electrode to produce a lithium battery. In some embodiments, such battery is a primary battery. In some embodiments, such battery is a rechargeable battery.

In some embodiments, a working ion in the cathode material 121 is selected from the group consisting of $Li^+$, $Na^+$, $H^+$, $Mg^{2+}$, $Al^{3+}$, or $Ca^{2+}$. In some embodiments, the working ion is selected from the group consisting of $Li^+$ or $Na^+$. In some embodiments, the cathode material 121 includes a solid including an ion-storage compound. In some embodiments, the ion is proton or hydroxyl ion and the cathode material 121 includes those used in a nickel-cadmium or nickel metal hydride battery. In some embodiments, the ion is lithium and the cathode material 121 is selected from the group consisting of metal fluorides, such as $CuF_2$, $FeF_2$, $FeF_3$, $BiF_3$, $CoF_2$, and $NiF_2$.

In some embodiments, the ion is lithium and the cathode material 121 is selected from the group consisting of metal oxides, such as CoO, $Co_3O_4$, NiO, CuO, and MnO.

In some embodiments, the ion is lithium and the cathode material 121 includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the cathode material 121 includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the cathode material 121 includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1-a) times a formal valence or valences of M", plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the cathode material 121 includes an intercalation compound selected from the group consisting of $A_{1-a}M''_a)_xM'_y(XD_4)_z$, $(A_{1-a}M''_a)_xM'_y(DXD_4)z$ and $A_{1-a}M''_a)_xM'_y(X_2D_7)_z$, where (1-a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the cathode material 121 includes an intercalation compound selected from the group consisting of ordered rocksalt compounds $LiMO_2$ including those having the α-$NaFeO_2$ and orthorhombic —$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg or Zr.

In some embodiments, the cathode material 121 includes a solid including amorphous carbon, disordered carbon, graphitic carbon, or a metal-coated or metal decorated carbon.

In some embodiments, the cathode material 121 can include a solid including nanostructures, for example, nanowires, nanorods, and nanotetrapods.

In some embodiments, the cathode material 121 includes a solid including an organic redox compound.

In some embodiments, the cathode material 121 can include a solid selected from the groups consisting of ordered rocksalt compounds $LiMO_2$ including those having the $\alpha$-$NaFeO_2$ and orthorhombic-$LiMnO_2$ structure type or their derivatives of different crystal symmetry, atomic ordering, or partial substitution for the metals or oxygen, wherein M Includes at least one first-row transition metal but may include non-transition metals including but not limited to Al, Ca, Mg, or Zr.

In some embodiments, the cathode material 121 can include a solid selected from the group consisting of $A_x(M'_{1-a} M''_a)y(XD_4)_z$, $A_x(M'_{1-a}M''_a)_y(DXD_4)_z$, and $A_x(M'_{1-a} M''_a)y(X_2D_7)_z$, and where x, plus y(1-a) times a formal valence or valences of M', plus ya times a formal valence or valence of M", is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the cathode material 121 can include a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. Li/Li+ that exceeds 4.3V including but not limited to $LiNi_{0.5}Mn_{1.5}O_4$; olivines $LiMPO_4$ and their derivatives, in which M includes one or more of Mn, Fe, Co, or Ni, partially fluorinated compounds such as $LiVPO_4F$, other "polyanion" compounds, and vanadium oxides $V_xO_y$ including $V_2O_5$ and $V_6O_{11}$.

In some embodiments, the thickness of the cathode material 121 can be in the range of about 250 µm to about 2,000 µm, about 300 µm to about 2,000 µm, about 350 µm to about 2,000 µm, 400 µm to about 2,000 µm, about 450 µm to about 2,000 µm, about 500 to about 2,000 µm, about 250 µm to about 1,500 µm, about 300 µm to about 1,500 µm, about 350 µm to about 1,500 µm, about 400 µm to about 1,500 µm, about 450 µm to about 1,500 µm, about 500 to about 1,500 µm, about 250 µm to about 1,000 µm, about 300 µm to about 1,000 µm, about 350 µm to about 1,000 µm, about 400 µm to about 1,000 µm, about 450 µm to about 1,000 µm, about 500 µm to about 1,000 µm, about 250 µm to about 750 µm, about 300 µm to about 750 µm, about 350 µm to about 750 µm, about 400 µm to about 750 µm, about 450 µm to about 750 µm, about 500 µm to about 750 µm, about 250 µm to about 700 µm, about 300 µm to about 700 µm, about 350 µm to about 700 µm, about 400 µm to about 700 µm, about 450 µm to about 700 µm, about 500 µm to about 700 µm, about 250 µm to about 650 µm, about 300 µm to about 650 µm, about 350 µm to about 650 µm, about 400 µm to about 650 µm, about 450 µm to about 650 µm, about 500 µm to about 650 µm, about 250 µm to about 600 µm, about 300 µm to about 600 µm, about 350 µm to about 600 µm, about 400 µm to about 600 µm, about 450 µm to about 600 µm, about 500 µm to about 600 µm, about 250 µm to about 550 µm, about 300 µm to about 550 µm, about 350 µm to about 550 µm, about 400 µm to about 550 µm, about 450 µm to about 550 µm, or about 500 µm to about 550 µm, inclusive of all ranges or any other distance therebetween.

In some embodiments, at least one of the anode material or the cathode material includes a semi-solid or a condensed ion-storing liquid reactant. By "semi-solid" it is meant that the material is a mixture of liquid and solid phases, for example, such as a semi-solid, particle suspension, colloidal suspension, emulsion, gel, or micelle. "Condensed ion-storing liquid" or "condensed liquid" means that the liquid is not merely a solvent as it is in the case of an aqueous flow cell catholyte or anolyte, but rather, that the liquid is itself redox-active. Such a liquid form may also be diluted by or mixed with another, non-redox-active liquid that is a diluent or solvent, including mixing with such a diluent to form a lower-melting liquid phase, emulsion or micelles including the ion-storing liquid. The cathode or anode material can be flowable semi-solid or condensed liquid compositions. A flowable anodic semi-solid (herein called "anolyte") and/or a flowable cathodic semi-solid ("catholyte") are/is comprised of a suspension of electrochemically-active agents (anode particulates and/or cathode particulates) and, optionally, electronically conductive particles. The cathodic particles and conductive particles are co-suspended in an electrolyte to produce a catholyte semi-solid. The anodic particles and conductive particles are co-suspended in an electrolyte to produce an anolyte semi-solid. The semi-solids are capable of flowing due to an applied pressure, gravitational force, or other imposed field that exerts a force on the semi-solid, and optionally, with the aid of mechanical vibration. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

In some embodiments, the separator 130 can be a thin, microporous membrane that electrically separates the cathode 120 from the anode 110 but allows ions to pass through the pores between the two electrodes during discharging and charging. In some embodiments, the separator 130 includes a thermoplastic polymer, such as polyolefins, polyvinyl chlorides, nylons, fluorocarbons, and polystyrenes, among others. In some embodiments, the separator 130 includes polyolefins material that comprises, for example, polyethylene, ultra-high molecular weight polyethylene, polypropylene, polybutene, polymethylpentene, polyisoprene, copolymers thereof, and their combinations. Exemplary combinations can include, but are not limited to, mixtures containing two or more of the following polyethylene, ultra-high molecular weight polyethylene, and polypropylene, as well as, mixtures of the foregoing with copolymers such as ethylene-butene copolymer and ethylene-hexene copolymer.

In some embodiments, the electrochemical cell 100 further includes an electrolyte (not shown in FIG. 1A), which is substantially contained in the first pouch 140. The electrolyte can include non-aqueous electrolyte such as lithium salt (for lithium ion batteries) or sodium salt (for sodium ion batteries) in a solvent. Exemplary lithium salts can include $LiPF_6$, $LiBF_4$, and $LiClO_4$, among others. Exemplary sodium salts include $NaClO_4$, $NaPF_6$ and Bis-Trifluoromethansulfonylimide sodium (Na-TFSI). Exemplary solvents include propylene carbonate (PC), ethylene carbonate (EC), dimethyl carbonate (DMC), dimethoxyethane (DME), diethyl carbonate (DEC), Tetrahydrofuran (THF), and Triethylene glycol dimethyl ether (Triglyme).

The first pouch 140 in the electrochemical cell 100 shown in FIG. 1A substantially contains the anode 110, the cathode 120, the separator 130, and the electrolyte (not shown). The first pouch 140 can physically separate the electrochemical cell 100 from adjacent cells so as to mitigate or eliminate defect propagation, and to facilitate easy handling of the electrochemical cell 100 during battery manufacturing. The first pouch 140 can also reduce the possibility of fire ignition of flammable electrolyte during possible welding processes in battery manufacturing, which at times generates sparks.

In some embodiments, the anode 110, the cathode 120, the separator 130, and the electrolyte (not shown) are completely sealed in the first pouch 140 (e.g., via vacuum sealing). In some embodiments, the first pouch 140 can be only partially sealed or not sealed at all. In some embodiments, the first pouch 140 can be sealed around its perimeter to enclose the anode 110, the cathode 120, the separator 130, and the electrolyte. In some embodiments, the seal of the first pouch 140 can substantially enclose the anode 110, the cathode 120, the separator 130, and the electrolyte. In some embodiments, the seal of the first pouch 140 has a sealing region, which has a width in a range of about 10 µm to about 10 mm, about 10 µm to about 9 mm, about 10 µm to about 8 mm, about 10 µm to about 7 mm, about 10 µm to about 6 mm, about 10 µm to about 5 mm, about 10 µm to about 4 mm, about 10 µm to about 3 mm, about 10 µm to about 2 mm, about 10 µm to about 1 mm, about 10 µm to about 900 µm, about 10 µm to about 800 µm, about 10 µm to about 700 µm, about 10 µm to about 600 µm, about 10 µm to about 500 µm, about 10 µm to about 400 µm, about 10 µm to about 300 µm, about 10 µm to about 200 µm, about 10 µm to about 100 µm, and about 10 µm to about 50 µm, inclusive of all widths and width ranges therebetween.

In some embodiments, the sealing region of the first pouch 140 is a certain distance from the outer edge of the first pouch 140. In some embodiments, the distance between the sealing region and the outer edge can be from about 10 µm to about 20 mm, about 10 µm to about 15 mm, about 5 µm to about 15 mm, about 5 µm to about 10 mm, about 4 µm to about 10 mm, about 3 µm to about 10 mm, about 2 µm to about 10 mm, about 1 µm to about 10 mm, about 10 µm to about 900 µm, about 10 µm to about 800 µm, about 10 µm to about 700 µm, about 10 µm to about 600 µm, about 10 µm to about 500 µm, about 10 µm to about 400 µm, about 10 µm to about 300 µm, about 10 µm to about 200 µm, about 10 µm to about 100 µm, and about 10 µm to about 50 µm, inclusive of all distances and ranges of distance therebetween.

In some embodiments, the sealing region of the first pouch 140 is a certain distance from an outermost edge of at least one of the anode 110 and the cathode 120. In some embodiments, the distance between the sealing region and the outermost edge of at least one of the anode 110 and the cathode 120 can be from about 1 µm to about 10 mm, about 1 µm to about 9 mm, about 1 µm to about 8 mm, about 1 µm to about 7 mm, about 1 µm to about 6 mm, about 1 µm to about 5 mm, about 1 µm to about 4 mm, about 1 µm to about 3 mm, about 1 µm to about 2 mm, about 1 µm to about 1 mm, about 1 µm to about 900 µm, about 1 µm to about 800 µm, about 1 µm to about 700 µm, about 1 µm to about 600 µm, about 1 µm to about 500 µm, about 1 µm to about 400 µm, about 1 µm to about 300 µm, about 1 µm to about 200 µm, about 1 µm to about 100 µm, and about 1 µm to about 50 µm, inclusive of all distances and ranges of distance therebetween.

In some embodiments, the separator 130 is larger than at least one of the anode 110 and the cathode 120. In some embodiments, the separator 130 is larger than at least one of the anode current collector 150 and the cathode current collector 160. In some embodiments, the separator 130 is larger than at least one of the anode material 111 and the cathode material 121. In some embodiments, the separator 130 extends beyond at least one of the anode 110, cathode 120, anode material 111, cathode material 121, ACC 150, and CCC 160, and therefore, can be sealed at the first pouch 140 inside the sealing region. In other words, the separator 130 extends into the sealing region of the first pouch 140 and effectively separating the anode 110 and the cathode 120. In some embodiments, the separator 130 extends into the sealing region of the first pouch 140 and completely separates the anode 110 and the cathode 120. In some embodiments, the separator 130 extends partially into the sealing region of the first pouch 140 and partially separates the anode 110 and the cathode 120. In some embodiments, the separator 130 extends to a plurality of locations of the sealing region of the first pouch 140 and effectively separates the anode 110 and the cathode 120 at those locations. For example, if at least one of the anode 110 and the cathode 120 has a tab connection for making an external electrical connection, the separator 130 may not extend to the location and region around the tab connection of the first pouch 140. In some embodiments, one or more of the plurality of locations and regions to which the separator 130 extends into the sealing region of the first pouch 140 can be used to form one or more structure for a functional purpose in the single pouch electrochemical cell 100. For example, a functional purpose can be a form of pressure release or pressure alleviation from pressure buildup due to overcharging, gas generation or a form of electrochemical malfunction. Similarly, in some embodiments, one or more of the plurality of locations and regions to which the separator 130 does not extend into the sealing region of the first pouch 140 can also be used to form one or more structure for a functional purpose in the single pouch electrochemical cell 100.

In these embodiments, the first pouch 140 can still reduce or eliminate chances of exposure to sparking (e.g., from welding processes) that could ignite the electrolyte. A final sealing step can be carried out after the welding process to seal one or more single pouch electrochemical cells into an external pouch or package, in which case the external pouch or package can function as moisture control. In some embodiments, the first pouch 140 is mechanically attached to cathode 120 and/or the anode 110. In some embodiments, the first pouch 140 is attached to the current collector of the cathode 120 and/or the current collector of anode 110 via, for example, heat sealing, glue, or any other method known in the art.

In some embodiments, the first pouch 140 includes a three-layer structure, namely an intermediate layer sandwiched by an outer layer and an inner layer, wherein the inner layer is in contact with the electrodes and the electrolyte. For example, the outer layer can include a nylon-based polymer film. The inner layer can include a polypropylene (PP) polymer film, which can be corrosion-resistive to acids or other electrolyte and insoluble in electrolyte solvents. The intermediate layer can include of aluminum (Al) foil. This structure allows the pouch to have both high mechanical flexibility and strength.

In some embodiments, the outer layer of the first pouch 140 includes polymer materials such as polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), inorganic ceramics, aluminum oxide ($Al_2O_3$), boehmite, carbon belt, cloth with flame retardant treatment, cloth with insulation treatment, and any combinations thereof.

In some embodiments, the intermediate layer of the first pouch 140 includes metal layers (foils, substrates, films, etc.) comprising aluminum (Al), copper (Cu), stainless steel (SUS), and their alloys or any combinations thereof.

In some embodiments, the inner layer of the first pouch 140 includes materials such as cast polypropylene (c-PP), polyethylene (PE), ethylene vinylacetate (EVA), PET, Polyvinyl acetate (PVA), polyamide (PA), acrylic adhesives, ultraviolet (UV)/electron beam (EB)/infrared (IR) curable resin, and any combinations thereof.

In some embodiments, the first pouch 140 can include a non-flammable material, such as for example, polyether ether ketone (PEEK), polyethylene naphthalate (PEN), polyethersulfone (PES), PI, polyphenylene sulfide (PPS), polyphenylene oxide (PPO), and any combinations thereof. In some embodiments, the first pouch 140 can include a coating or a film of flame retardant additive material, such as flame retardant PET.

In some embodiments, the first pouch 140 includes a two-layer structure, namely an outer layer and an inner layer. In some embodiments, the outer layer can include PET, PBT, or other materials as described above. In some embodiments, the inner layer can include PP, PE, or other materials described above.

In some embodiments, the first pouch 140 can include a water barrier layer and/or gas barrier layer. In some embodiments, the barrier layer can include a metal layer and/or an oxide layer. In some embodiments, it can be beneficial to include the oxide layer because oxide layers tend to be insulating and can prevent short circuits within the battery.

In some embodiments, there can be only one (or two) unit cell(s) within the first pouch 140. In some embodiments, the first pouch 140 can be substantially thinner than pouches commonly used for multi-stack electrochemical cells. For example, the first pouch 140 can have a thickness less than 200 µm, less than 150 µm, less than 100 µm, less than 50 µm, less than 45 µm, less than 40 µm, less than 35 µm, less than 30 µm, less than 25 µm, less than 20 µm, less than 18 µm, less than 16 µm, less than 14 µm, less than 12 µm, less than 10 µm, less than 9 µm, less than 8 µm, less than 7 µm, less than 6 µm, less than 5 µm, less than 4 µm, less than 3 µm, less than 2 µm, or less than 1 µm. In some embodiments, the thickness of the first pouch 140 can depend on at least two aspects. In one aspect, it can be desirable to achieve high energy density in the resulting electrochemical cells, in which case thinner pouches can be helpful since a larger portion of space within an electrochemical cell can be reserved for electrode materials. In another aspect, it can be desirable to maintain or improve the safety advantage of the first pouch 140. In this case, a thicker pouch and/or non-flammable pouch can be helpful to, for example, reduce fire hazard. In some embodiments, the pouch thickness can be quantified as a ratio of the volume occupied by the pouch material to the total volume of the electrochemical cell.

In some embodiments, the ratio of electrode material (e.g., anode material 111 and/or cathode material 121) to non-electrode material, such as the current collector and/or the first pouch 140 can be defined in terms of ratio between the thicknesses. In some embodiments, the ratio of an electrode material to a current collector can be greater than about 12:1, about 14:1, about 16:1, about 18:1, about 20:1, about 22:1, about 24:1, about 26:1, about 28:1, about 30:1, about 32:1, about 34:1, about 36:1, about 38:1, about 40:1, about 42:1, about 44:1, about 46:1, about 48:1, about 50:1, about 52:1, about 54:1, about 56:1, about 58:1, about 60:1, about 62:1, about 64:1, about 66:1, about 68:1, about 70:1, about 72:1, about 74:1, about 76:1, about 78:1, about 80:1, about 82:1, about 84:1, about 86:1, about 88:1, about 90:1, about 92:1, about 94:1, about 96:1, about 98:1, about 100:1, about 110:1, about 112:1, about 114:1, about 116:1, about 118:1, about 120:1, about 122:1, about 124:1, about 126:1, about 128:1, about 130:1, about 132:1, about 134:1, about 136:1, about 138:1, about 140:1, about 142:1, about 144:1, about 146:1, about 148:1, about 150:1, about 152:1, about 154:1, about 156:1, about 158:1, about 160:1, about 162:1, about 164:1, about 166:1, about 168:1, about 170:1, about 172:1, about 174:1, about 176:1, about 178:1, about 180:1, about 182:1, about 184:1, about 186:1, about 188:1, about 190:1, about 192:1, about 194:1, about 196:1, about 198:1, about 200:1, about 300:1, about 400:1, about 500:1, about 600:1, about 700:1, about 800:1, about 900:1, about 1000:1, and about 2000:1, inclusive of all thickness ratios therebetween.

In some embodiments, the current collector can be coated on the first pouch 140, providing a combined thickness. In these embodiments, the ratio between an electrode material and the combined thickness of a current collector and the first pouch 140 can be about 12:1, about 14:1, about 16:1, about 18:1, about 20:1, about 22:1, about 24:1, about 26:1, about 28:1, about 30:1, about 32:1, about 34:1, about 36:1, about 38:1, about 40:1, about 42:1, about 44:1, about 46:1, about 48:1, about 50:1, about 52:1, about 54:1, about 56:1, about 58:1, about 60:1, about 62:1, about 64:1, about 66:1, about 68:1, about 70:1, about 72:1, about 74:1, about 76:1, about 78:1, about 80:1, about 82:1, about 84:1, about 86:1, about 88:1, about 90:1, about 92:1, about 94:1, about 96:1, about 98:1, about 100:1, about 110:1, about 112:1, about 114:1, about 116:1, about 118:1, about 120:1, about 122:1, about 124:1, about 126:1, about 128:1, about 130:1, about 132:1, about 134:1, about 136:1, about 138:1, about 140:1, about 142:1, about 144:1, about 146:1, about 148:1, about 150:1, about 152:1, about 154:1, about 156:1, about 158:1, about 160:1, about 162:1, about 164:1, about 166:1, about 168:1, about 170:1, about 172:1, about 174:1, about 176:1, about 178:1, about 180:1, about 182:1, about 184:1, about 186:1, about 188:1, about 190:1, about 192:1, about 194:1, about 196:1, about 198:1, about 200:1, about 300:1, about 400:1, about 500:1, about 600:1, about 700:1, about 800:1, about 900:1, about 1000:1, and about 2000:1, inclusive of all thickness ratios therebetween.

In some embodiments, the first pouch 140 includes a single layer of lower cost materials that are thinner. For example, these materials can be polypropylene or a combination of polyolefins that can be sealed together using heat or pressure (e.g., thermal fusion or vacuum sealing).

In some embodiments, the first pouch 140 includes a single layer of flame retardant materials so as to prevent the propagation of fire hazard from one single pouch electrochemical cell to another. In some embodiments, the first pouch 140 includes an air-proof material so as to prevent the propagation of gas released by one single pouch electrochemical cell to another, thereby reducing defect propagation.

In some embodiments, the first pouch 140 and the flame retardant 170 are completely sealed in the second pouch 180

(e.g., via vacuum sealing). In some embodiments, the second pouch 180 can be only partially sealed or not sealed at all. In some embodiments, the second pouch 180 can be sealed around its perimeter to enclose the first pouch 140 and the flame retardant 170. In some embodiments, the seal of the second pouch 180 can substantially enclose the first pouch 140 and the flame retardant 170. In some embodiments, the seal of the second pouch 180 has a sealing region, which has a width in a range of about 10 µm to about 10 mm, about 10 µm to about 9 mm, about 10 µm to about 8 mm, about 10 µm to about 7 mm, about 10 µm to about 6 mm, about 10 µm to about 5 mm, about 10 µm to about 4 mm, about 10 µm to about 3 mm, about 10 µm to about 2 mm, about 10 µm to about 1 mm, about 10 µm to about 900 µm, about 10 µm to about 800 µm, about 10 µm to about 700 µm, about 10 µm to about 600 µm, about 10 µm to about 500 µm, about 10 µm to about 400 µm, about 10 µm to about 300 µm, about 10 µm to about 200 µm, about 10 µm to about 100 µm, and about 10 µm to about 50 µm, inclusive of all widths and width ranges therebetween.

In some embodiments, the sealing region of the second pouch 180 is a certain distance from the outer edge of the second pouch 180. In some embodiments, the distance between the sealing region and the outer edge can be from about 10 µm to about 20 mm, about 10 µm to about 15 mm, about 10 µm to about 10 mm, about 10 µm to about 5 mm, about 10 µm to about 4 mm, about 10 µm to about 3 mm, about 10 µm to about 2 mm, about 10 µm to about 1 mm, about 10 µm to about 900 µm, about 10 µm to about 800 µm, about 10 µm to about 700 µm, about 10 µm to about 600 µm, about 10 µm to about 500 µm, about 10 µm to about 400 µm, about 10 µm to about 300 µm, about 10 µm to about 200 µm, about 10 µm to about 100 µm, and about 10 µm to about 50 µm, inclusive of all distances and ranges of distance therebetween.

In some embodiments, the sealing region of the second pouch 180 is a certain distance from an outermost edge of the first pouch 140. In some embodiments, the distance between the sealing region and the outermost edge of the first pouch 140 can be from about 1 µm to about 10 mm, about 1 µm to about 9 mm, about 1 µm to about 8 mm, about 1 µm to about 7 mm, about 1 µm to about 6 mm, about 1 µm to about 5 mm, about 1 µm to about 4 mm, about 1 µm to about 3 mm, about 1 µm to about 2 mm, about 1 µm to about 1 mm, about 1 µm to about 900 µm, about 1 µm to about 800 µm, about 1 µm to about 700 µm, about 1 µm to about 600 µm, about 1 µm to about 500 µm, about 1 µm to about 400 µm, about 1 µm to about 300 µm, about 1 µm to about 200 µm, about 1 µm to about 100 µm, and about 1 µm to about 50 µm, inclusive of all distances and ranges of distance therebetween.

In some embodiments, the second pouch 180 can have a thickness less than 200 µm, less than 150 µm, less than 100 µm, less than 50 µm, less than 45 µm, less than 40 µm, less than 35 µm, less than 30 µm, less than 25 µm, less than 20 µm, less than 18 µm, less than 16 µm, less than 14 µm, less than 12 µm, less than 10 µm, less than 9 µm, less than 8 µm, less than 7 µm, less than 6 µm, less than 5 µm, less than 4 µm, less than 3 µm, less than 2 µm, or less than 1 µm.

As shown, components of a single electrochemical cell are contained in the first pouch 140. In some embodiments, the components of multiple electrochemical cells can be contained in the first pouch 140. In other words, multiple anodes, cathodes, and separators can be disposed in the first pouch 140. The flame retardant 170 can be disposed and configured to extinguish flames in multiple electrochemical cells. Said another way, the flame retardant 170 can be incorporated into an electrochemical cell system. In some embodiments, an electrochemical cell system can refer to a battery rack with multiple electrochemical cells, a battery pack with multiple electrochemical cells, or any other system with multiple electrochemical cells. In some embodiments, the electrochemical cell system can include 2, 3, 4, 5, 6, 7, 8, 9, 10, at least about 10, at least about 20, at least about 30, at least about 40, at least about 50, at least about 60, at least about 70, at least about 80, at least about 90, at least about 100, at least about 200, at least about 300, at least about 400, at least about 500, at least about 600, at least about 700, at least about 800, or at least about 900 electrochemical cells, inclusive of all values and ranges therebetween.

As shown, a single pouch is disposed in the second pouch 180. In some embodiments, the second pouch 180 can contain multiple pouches, each containing one or more electrochemical cells. In other words, the flame retardant 170 can be incorporated into an electrochemical cell system with multiple pouches disposed within the second pouch. The flame retardant 170 can be disposed and configured to extinguish flames in multiple electrochemical cells. In some embodiments, the second pouch 180 can contain 2, 3, 4, 5, 6, 7, 8, 9, 10, at least about 10, at least about 20, at least about 30, at least about 40, at least about 50, at least about 60, at least about 70, at least about 80, at least about 90, at least about 100, at least about 200, at least about 300, at least about 400, at least about 500, at least about 600, at least about 700, at least about 800, or at least about 900 pouches, inclusive of all values and ranges therebetween. In some embodiments, each of the pouches disposed in the second pouch 180 can contain one or more electrochemical cells. In some embodiments, the second pouch 180 can be nonporous or substantially nonporous.

In some embodiments, the separator 130 can be large enough to be disposed and sealed along with the first pouch 140. In some embodiments, the first pouch 140 can include a laminate sheet and the laminate sheet can include a periphery portion that extends beyond a periphery of the separator 130 such that the pouch can be joined to form a seal. In some embodiments, the inner layers of the pouch are each formed with a material that is thermally bondable to itself such that when the two laminate sheets are joined, the two inner layers can be joined around their peripheries and thermally bond to each other to form a hermetic seal. Additional examples are described in International Patent Publication No. WO 2013/173689, entitled "Electrochemical Cells and Methods of Manufacturing the Same," the entire disclosure of which is hereby incorporated by reference.

In some embodiments, a tab (electrical lead) can be long enough that when the pouch is sealed, the tab is exposed outside the pouch and can be used for electrically connecting the electrochemical cell. For example, a first tab from the ACC 150 and a second tab from the CCC 160 can be used for connecting to at least one of the negative end and positive end of an external circuit. In some embodiments, the tab can be sealed inside the pouch, and in such cases, a hole can be created in the pouch to enable electrical connection between at least one of the ACC 150 and CCC 160 and an external contact or an electrical circuit. One or more hole can be placed in any location on the pouch, with preferential positions being next to the respective ACC 150 and CCC 160.

Figure 2:
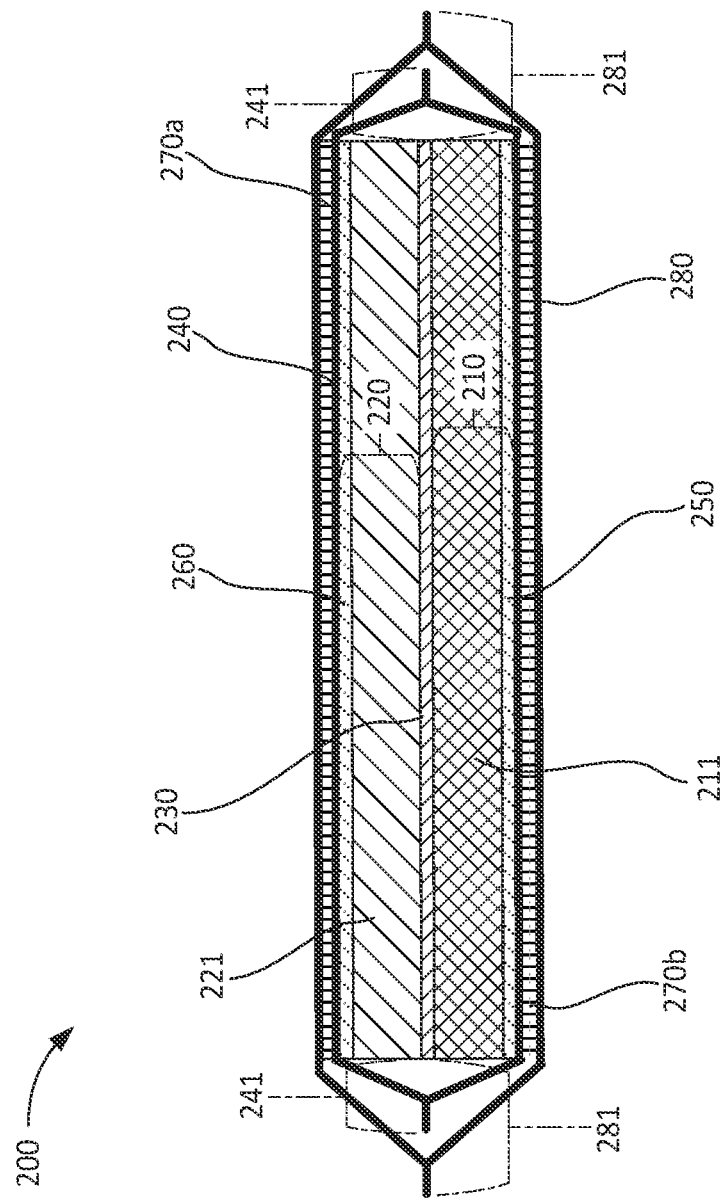
FIG. 2 shows a schematic view of an electrochemical cell with a flame retardant mechanism, according to an embodiment.

FIG. 2 shows a schematic view of an electrochemical cell 200 with a flame retardant mechanism, according to an embodiment. The electrochemical cell 200 includes an anode 210 (including an anode material 211 disposed on an anode current collector 250), a cathode 220 (including a cathode material 221 disposed on a cathode current collector 260), and a separator 230 disposed between the anode material 211 and the cathode material 221. The anode 210, the cathode 220, and the separator 230 are disposed in a first pouch 240. The first pouch 240 is coated with flame retardants 270a, 270b (collectively referred to as flame retardants 270) and disposed in a second pouch 280. The first pouch 240 includes a first pouch sealing region 241 and the second pouch includes a second pouch sealing region 281. In some embodiments, the anode 210, the anode material 211, the anode current collector 250, the cathode 220, the cathode material 221, the cathode current collector 260, the first pouch 240, the flame retardant 270, and the second pouch 280 can be the same or substantially similar to the anode 110, the anode material 111, the anode current collector 150, the cathode 120, the cathode material 121, the cathode current collector 160, the first pouch 140, the flame retardant 170, and the second pouch 180, as described above, with reference to FIG. 1A. Thus, certain aspects of the anode 210, anode material 211, the anode current collector 250, the cathode 220, the cathode material 221, the cathode current collector 260, the first pouch 240, the flame retardant 270, and the second pouch 280 are not described in greater detail herein.

As shown, the flame retardants 270 coat both the side of the first pouch 240 adjacent to the anode 210 (hereinafter "anode side") and the side of the first pouch adjacent to the cathode 220 (hereinafter "cathode side"). In some embodiments, the flame retardants 270 can coat only the anode side of the first pouch 240. In some embodiments, the flame retardant 270 can coat only the cathode side of the first pouch 240. In some embodiments, the flame retardant 270 can coat the sealing region of the first pouch 241. As shown the flame retardant 270a coats the cathode side of the first pouch 240 while the flame retardant 270b coats the anode side of the first pouch 240. In some embodiments, the flame retardant 270a can be the same or substantially similar to the flame retardant 270b. In some embodiments, the flame retardant 270a can be different from the flame retardant 270b. For example, a material that produces a flame retardant gas can be disposed on the anode side of the first pouch 240 and a liquid or melting flame retardant can be disposed on the cathode side of the first pouch 240.

Figure 3:
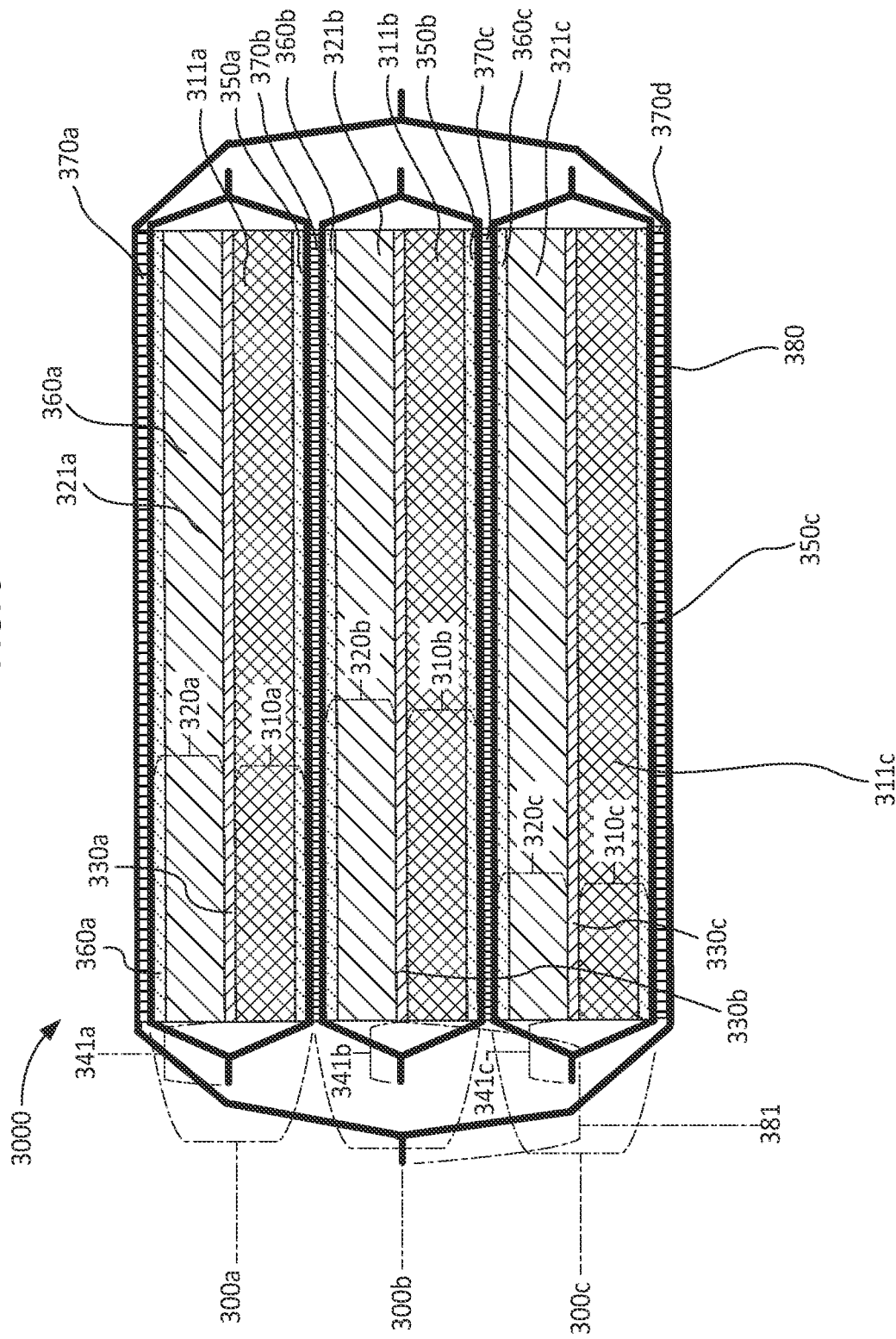
FIG. 3 shows a schematic view of a battery module including multiple electrochemical cells and flame retardant mechanisms, according to an embodiment.

FIG. 3 shows a schematic view of an electrochemical cell stack 3000 with a flame retardant mechanism, according to an embodiment. The electrochemical cell stack 3000 includes electrochemical cells 300a, 300b, 300c, (collectively referred to as electrochemical cells 300). Each of the electrochemical cells 300 includes an anode 310a, 310b, 310c (collectively referred to as anodes 310) with anode material 311a, 311b, 311c (collectively referred to as anode material 311) and an anode current collector 350a, 350b, 350c (collectively referred to as anode current collectors 350), a cathode 320a, 320b, 320c (collectively referred to as cathodes 320) with cathode material 321a, 321b, 321c (collectively referred to as cathode material 321) and a cathode current collector 360a, 360b, 360c (collectively referred to as cathode current collectors 360) with separators 330a, 330b, 330c (collectively referred to as separators 330) disposed between the anodes 310 and the cathodes 320. The anode 310a, the cathode 320a, and the separator 330a are disposed in a cell pouch 340a. The anode 310b, the cathode 320b, and the separator 330b are disposed in a cell pouch 340b. The anode 310c, the cathode 320c, and the separator 330c are disposed in a cell pouch 340c. The cell pouches 340a, 340b, 340c (collectively referred to as cell pouches 340) include sealing regions 341a, 341b, 341c (collectively referred to as sealing regions 341). Flame retardants 370a, 370b, 370c, 370d (collectively referred to as flame retardants 370) are coupled to the outside of the cell pouches 340. The cell pouches 340 are disposed in a stack pouch 380. The stack pouch 380 includes sealing region 381.

In some embodiments, the anodes 310, the anode material 311, the anode current collectors 350, the cathodes 320, the cathode material 321, the cathode current collectors 360, the cell pouches 340, the flame retardants 370, and the stack pouch 380 can be the same or substantially similar to the anode 110, the anode material 111, the anode current collector 150, the cathode 120, the cathode material 121, the cathode current collector 160, the first pouch 140, the flame retardant 170, and the second pouch 180, as described above, with reference to FIG. 1.

In some embodiments, the electrochemical cell 300a, the electrochemical cell 300b, and the electrochemical cell 300c, can have the same or substantially similar cell chemistries. In some embodiments, the electrochemical cell 300a, the electrochemical cell 300b, and the electrochemical cell 300c, can have disparate cell chemistries. In other words, the electrochemical cell 300a can have a first cell chemistry, the electrochemical cell 300b can have a second cell chemistry, and the electrochemical cell 300c can have a third cell chemistry, wherein the first cell chemistry is different from the second cell chemistry and/or the third cell chemistry. In some embodiments, the flame retardant 370a, the flame retardant 370b, the flame retardant 370c, and the flame retardant 370d can be the same or substantially similar. In some embodiments, the flame retardant 370a, the flame retardant 370b, the flame retardant 370c, and the flame retardant 370d can be disparate. For example, the flame retardant 370a can include a flame retardant liquid while the flame retardant 370b can include a gas suppression precursor. As another example, flame retardant 370a can include a first gas suppression precursor (e.g., $NaHCO_3$) while the flame retardant 370b can include a second gas suppression precursor (e.g., $PBCO_3$), wherein the second gas suppression precursor is different from the first gas suppression precursor.

As shown, the electrochemical cell stack 3000 includes 3 electrochemical cells 300. In some embodiments, the electrochemical cell stack 3000 can include 2, 3, 4, 5, 6, 7, 8, 9, 10, 11, 12, 13, 14, 15, 16, 17, 18, 19, 20, or more than about 20 electrochemical cells 300.

FIGS. 4A-4E show a schematic view of an electrochemical cell 400 with a flame retardant mechanism, according to an embodiment. The electrochemical cell 400 includes an anode 410 (including an anode material 411 disposed on an anode current collector 450), a cathode 420 (including a cathode material 421 disposed on a cathode current collector 460), and a separator 430 disposed between the anode material 411 and the cathode material 421. The anode 410, the cathode 420, and the separator 430 are disposed in a pouch 440. The pouch 440 is infused with a flame retardant 470a. In some embodiments, the anode 410, the anode material 411, the anode current collector 450, the cathode 420, the cathode material 421, the cathode current collector 460, the pouch 440, and the flame retardant 470a, can be the same or substantially similar to the anode 110, the anode material 111, the anode current collector 150, the cathode 120, the cathode material 121, the cathode current collector 160, the pouch 140, and the flame retardant 170, as described above, with reference to FIG. 1A. Thus, certain aspects of the anode 410, anode material 411, the anode current collector 450, the cathode 420, the cathode material 421, the cathode current collector 460, the pouch 440, and the flame retardant 470a, are not described in greater detail herein. The pouch 440 includes a sealing region 441. In some embodiments, the electrochemical cell 400 can be disposed in a second pouch (not shown).

Figure 4D:
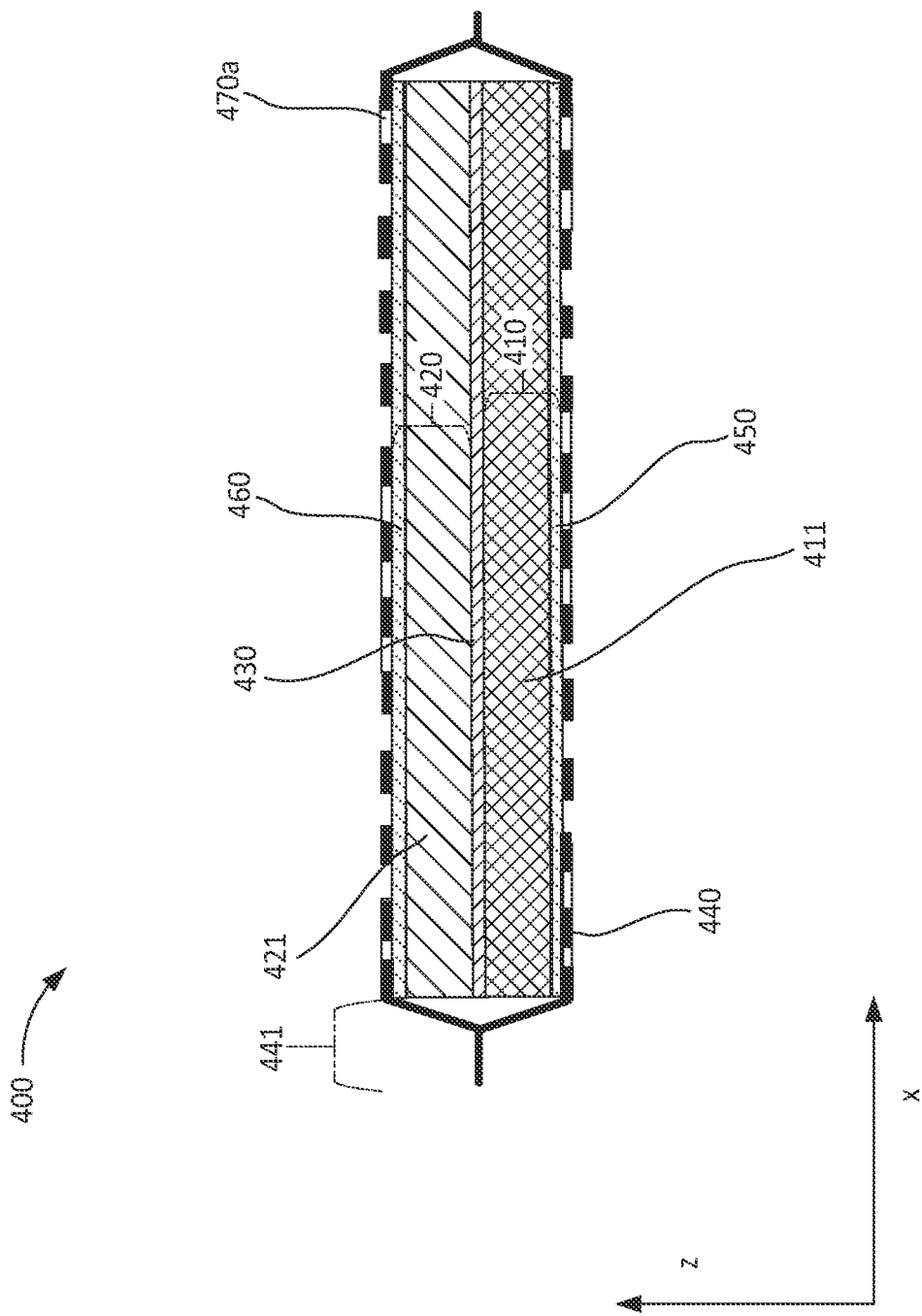
FIG. 4D shows a schematic view of an electrochemical cell with a flame retardant mechanism, according to an embodiment.
Figure 4E:
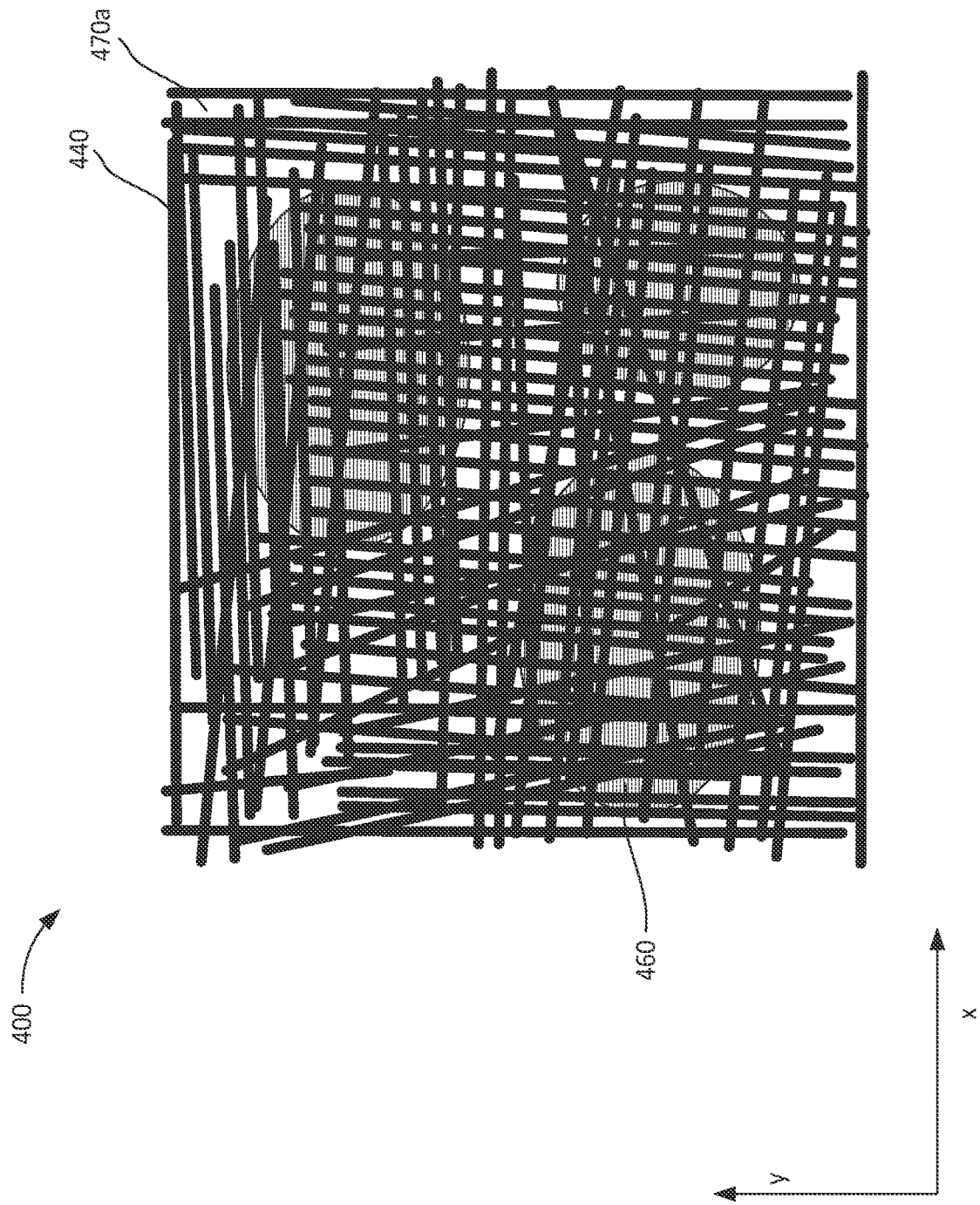
FIG. 4E shows a schematic view of an electrochemical cell with a flame retardant mechanism, according to an embodiment.

FIGS. 4A-4B show the electrochemical cell 400 with the flame retardant 470a infused in the pouch 440 and unactivated. In other words, FIGS. 4A-4B depict the electrochemical cell 400 prior to a flame event or high temperature event, with FIG. 4A showing a cross-sectional view of the electrochemical cell 400 and FIG. 4B showing a top view of the electrochemical cell 400. In other words, FIG. 4A shows a view with an x-axis and a z-axis, while FIG. 4B shows a view the x-axis and a y-axis. FIG. 4C shows the electrochemical cell 400 with portions of the flame retardant 470a converted to an activated flame retardant 470b. In other words, FIG. 4C shows the electrochemical cell 400 during the flame event or high temperature event. FIGS. 4D-4E show the electrochemical cell 400 after the activated flame retardant 470b has dissipated. In other words, FIGS. 4D-4E show the electrochemical cell 400 after the flame event or high temperature event has occurred. FIG. 4D shows a cross-sectional view of the electrochemical cell 400 and FIG. 4E shows a top view of the electrochemical cell 400. As shown in FIGS. 4D and 4E, portions of the flame retardant 470a are now absent from the electrochemical cell 400, rendering portions of the cathode current collector 460 visible in the top view of FIG. 4E. After the flame event or high temperature event has occurred, portions of the pouch 440 remain in place. This can prevent the anode current collector 450 and/or the cathode current collector 460 from being exposed or contacting current collectors in adjacent electrochemical cells. Preventing contact between current collectors in adjacent electrochemical cells can prevent short circuit events.

In some embodiments, the pouch 440 can include a porous film that is infused with the flame retardant 470a. In some embodiments, the flame retardant 470a can be infused into the sealing region 441 of the pouch 440. In some embodiments, the pouch 440 can include a network of fibers that is infused with the flame retardant 470a. As shown in FIG. 4C, the activated flame retardant 470b appears as a group of gas clouds that suppress a flame. In some embodiments, the activated flame retardant 470b can include a foam produced when the flame retardant 470a reaches a threshold temperature. In some embodiments, the activated flame retardant 470b can be a liquid produced when the flame retardant 470a reaches a threshold temperature (e.g., the flame retardant 470a can melt to form the activated flame retardant 470b).

Figure 5A:
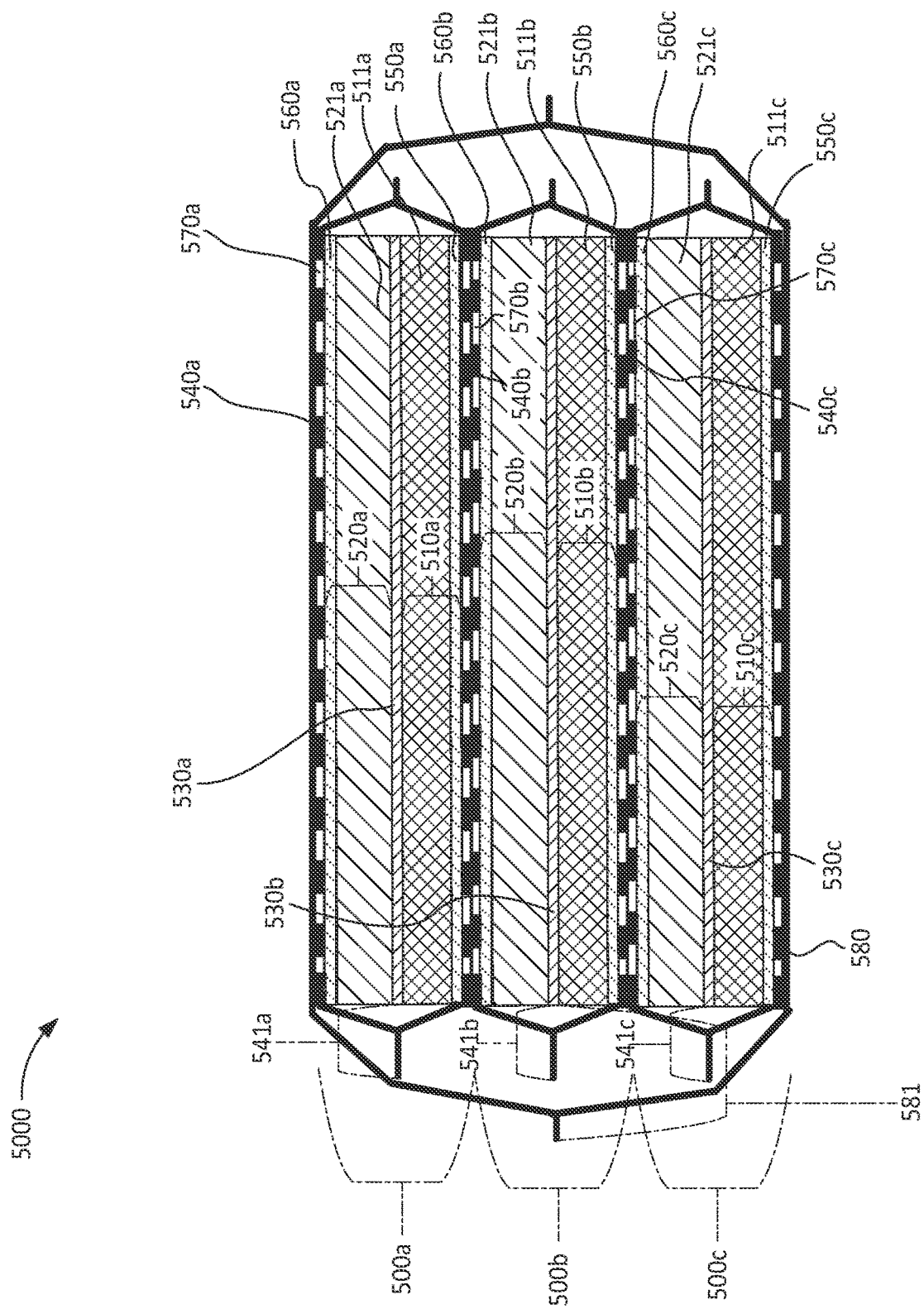
FIG. 5A shows a schematic view of a battery module including multiple electrochemical cells and flame retardant mechanisms, according to an embodiment.
Figure 5B:
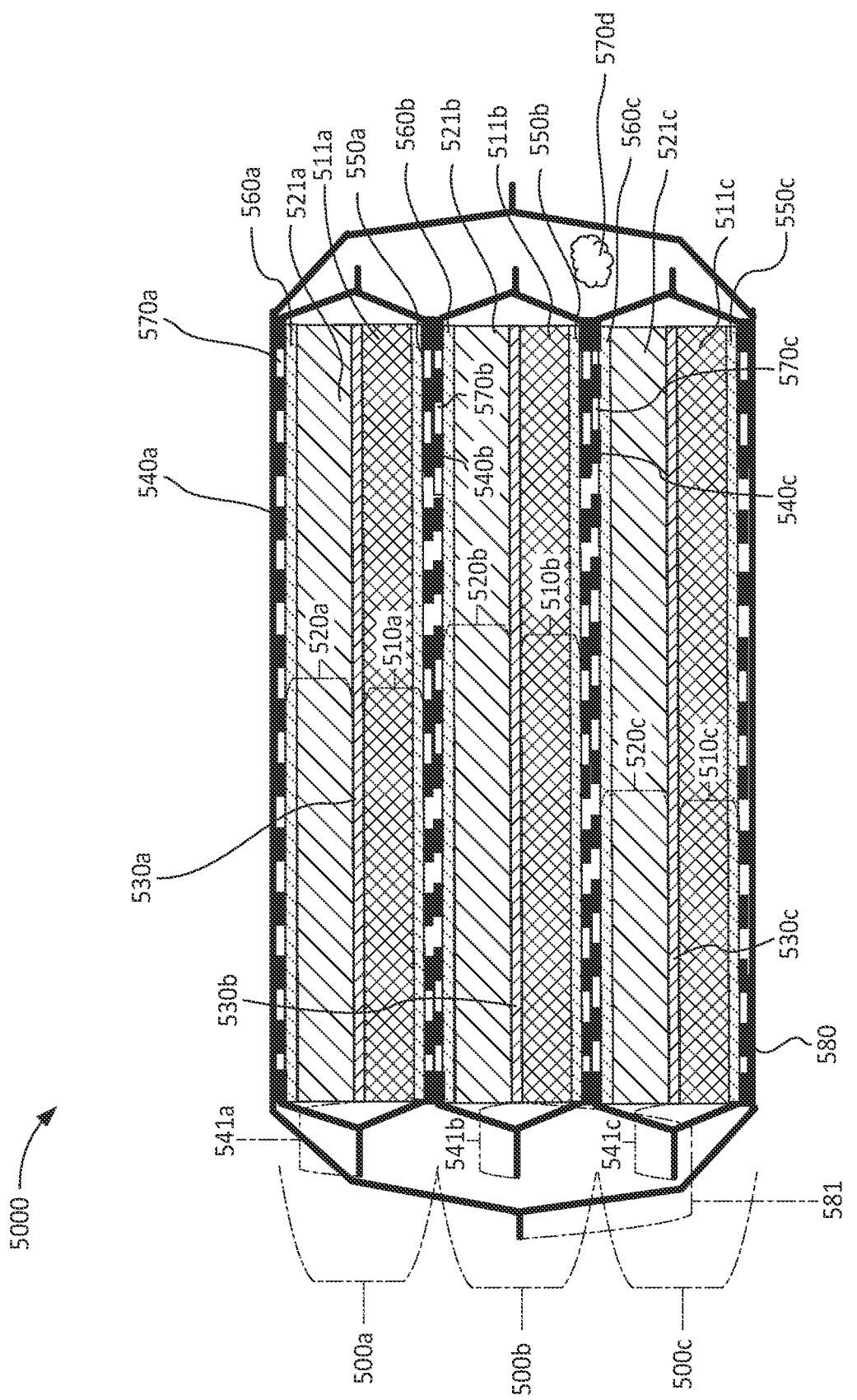
FIG. 5B shows a schematic view of a battery module including multiple electrochemical cells and flame retardant mechanisms, according to an embodiment.
Figure 5C:
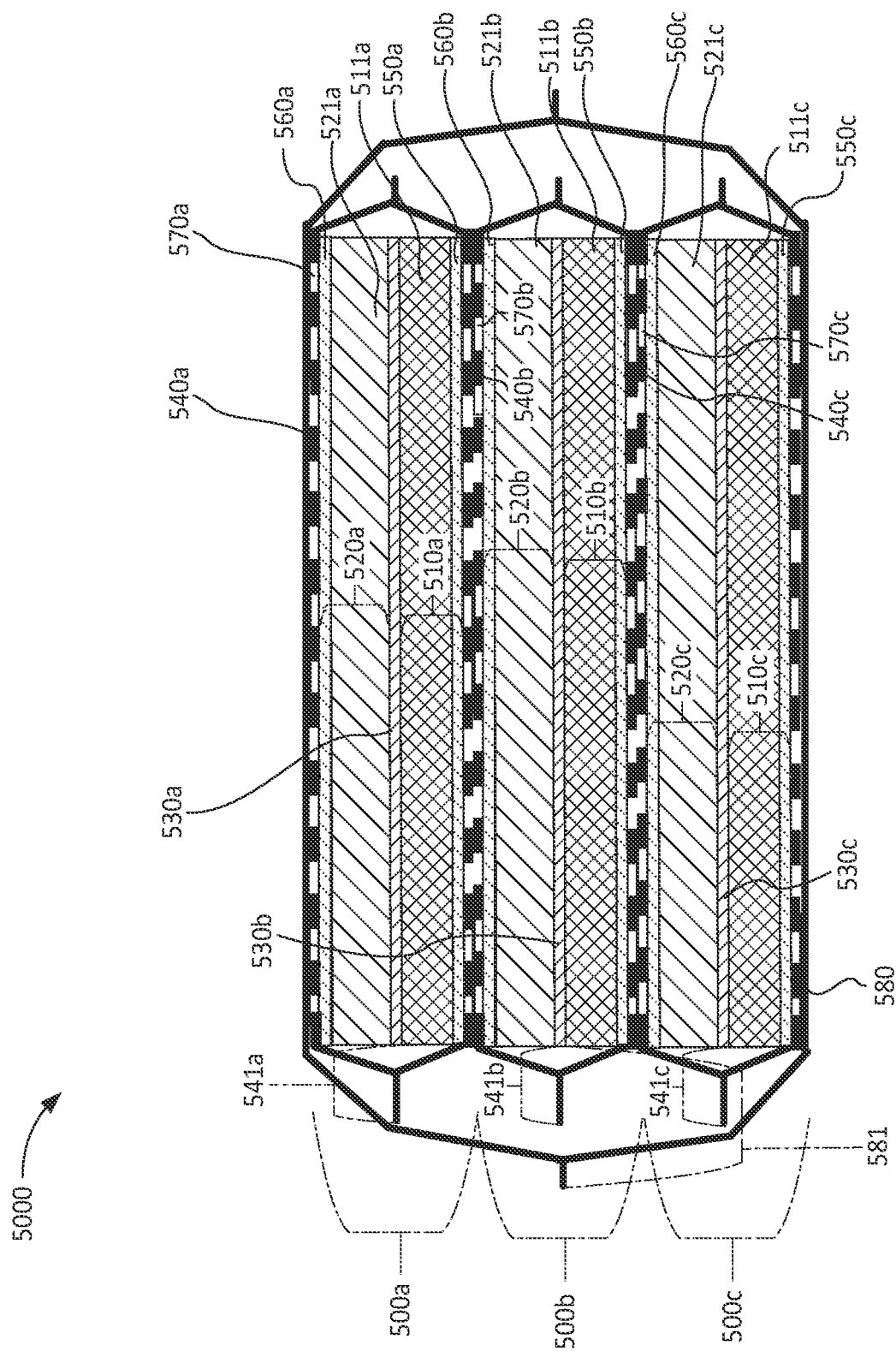
FIG. 5C shows a schematic view of a battery module including multiple electrochemical cells and flame retardant mechanisms, according to an embodiment.

FIGS. 5A-5C show a schematic view of an electrochemical cell stack 5000 with a flame retardant mechanism, according to an embodiment. The electrochemical cell stack 5000 includes electrochemical cells 500a, 500b, 500c, (collectively referred to as electrochemical cells 500). Each of the electrochemical cells 500 includes an anode 510a, 510b, 510c (collectively referred to as anodes 510) with anode material 511a, 511b, 511c (collectively referred to as anode material 511) and an anode current collector 550a, 550b, 550c (collectively referred to as anode current collectors 550), a cathode 520a, 520b, 520c (collectively referred to as cathodes 520) with cathode material 521a, 521b, 521c (collectively referred to as cathode material 521) and a cathode current collector 560a, 560b, 560c (collectively referred to as cathode current collectors 560) with separators 530a, 530b, 530c (collectively referred to as separators 530) disposed between the anodes 510 and the cathodes 520. The anode 510a, the cathode 520a, and the separator 530a are disposed in a cell pouch 540a. The anode 510b, the cathode 520b, and the separator 530b are disposed in a cell pouch 540b. The anode 510c, the cathode 520c, and the separator 530c are disposed in a cell pouch 540c. The cell pouches 540a, 540b, 540c (collectively referred to as cell pouches 540) include sealing regions 541a, 541b, 541c (collectively referred to as sealing regions 541). Flame retardant 570a, 570b, 570c are infused into the cell pouches 540a, 540b, 540c. The cell pouches 540 are disposed in a stack pouch 580. The stack pouch 580 includes sealing region 581.

In some embodiments, the anodes 510, the anode material 511, the anode current collectors 550, the cathodes 520, the cathode material 521, the cathode current collectors 560, the cell pouches 540, and the flame retardant 570a, 570b, 570c can be the same or substantially similar to the anode 410, the anode material 411, the anode current collector 450, the cathode 420, the cathode material 421, the cathode current collector 460, the pouch 440, and the flame retardant 470a, as described above, with reference to FIGS. 4A-4E. Thus, certain aspects of the anodes 510, the anode material 511, the anode current collectors 550, the cathodes 520, the cathode material 521, the cathode current collectors 560, the cell pouches 540, and the flame retardant 570a, 570b, 570c are not described in greater detail herein. In some embodiments, the stack pouch 580 and the sealing region 581 can be the same or substantially similar to the stack pouch 380 and the sealing region 381, as described above with reference to FIG. 3. Thus, certain aspects of the stack pouch 580 and the sealing region 581 are not described in greater detail herein.

FIG. 5A shows the electrochemical cell stack 5000 with the flame retardant 570a, 570b, 570c infused in the pouches 540a, 540b, 540c and unactivated. In other words, FIG. 5A depicts the electrochemical cell stack 5000 prior to a flame event or high temperature event. FIG. 5B shows the electrochemical cell stack 5000 with portions of the flame retardant 570a, 570b, 570c converted to an activated flame retardant 570d. In other words, FIG. 5B shows the electrochemical cell stack 5000 during the flame event or high temperature event. FIG. 5C shows the electrochemical cell stack 5000 after the activated flame retardant 570d has dissipated. In other words, FIG. 5C shows the electrochemical cell stack 5000 after the flame event or high temperature event has occurred. As shown in FIG. 5C, electrical contact between adjacent electrochemical cells (electrochemical cell 500a and electrochemical cell 500b or electrochemical cell 500b and electrochemical cell 500c) is hindered by portions of the pouches 540 remaining intact after the flame event or high temperature event. In some embodiments, flame retardant can be disposed between pouches. In some embodiments, flame retardant (e.g., the flame retardant 570a, the flame retardant 570b, and/or the flame retardant 570c) can be disposed between the pouch 540a and the pouch 540b. In some embodiments, flame retardant can be disposed between the pouch 540b and the pouch 540c.

In some embodiments, the electrochemical cell 500a, the electrochemical cell 500b, and the electrochemical cell 500c can all have the same or substantially similar cell chemistries. In other words, the anode material 511a, the anode material 511b, and the anode material 511c can all be the same or substantially similar. In some embodiments, the cathode material 521a, the cathode material 521b, and the cathode material 521c can all be the same or substantially similar. In some embodiments, the electrochemical cell 500a can have a different cell chemistry from the electrochemical cell 500b or electrochemical cell 500c. In other words, the anode material 511a can be composed of a different material from the anode material 511b. In some embodiments, the anode material 511a can be composed of a different material from the anode material 511c. In some embodiments, the anode material 511b can be composed of a different material from the anode material 511c. In some embodiments, the cathode material 521a can be composed of a different material from the cathode material 521b. In some embodiments, the cathode material 521a can be composed of a different material from the cathode material 521c. In some embodiments, the cathode material 521b can be composed of a different material from the cathode material 521c.

In some embodiments, flame retardant 570a, flame retardant 570b, and flame retardant 570c can be the same or substantially similar. In some embodiments, flame retardant 570a can be different from flame retardant 570b or flame retardant 570c. In some embodiments, flame retardant 570b can be different from flame retardant 570c. For example, flame retardant 570a can produce a gas when the flame retardant 570a reaches a threshold temperature, flame retardant 570b can produce a foam when the flame retardant 570b reaches a threshold temperature, and flame retardant 570c can produce a liquid the flame retardant 570c reaches a threshold temperature.

Figure 6:
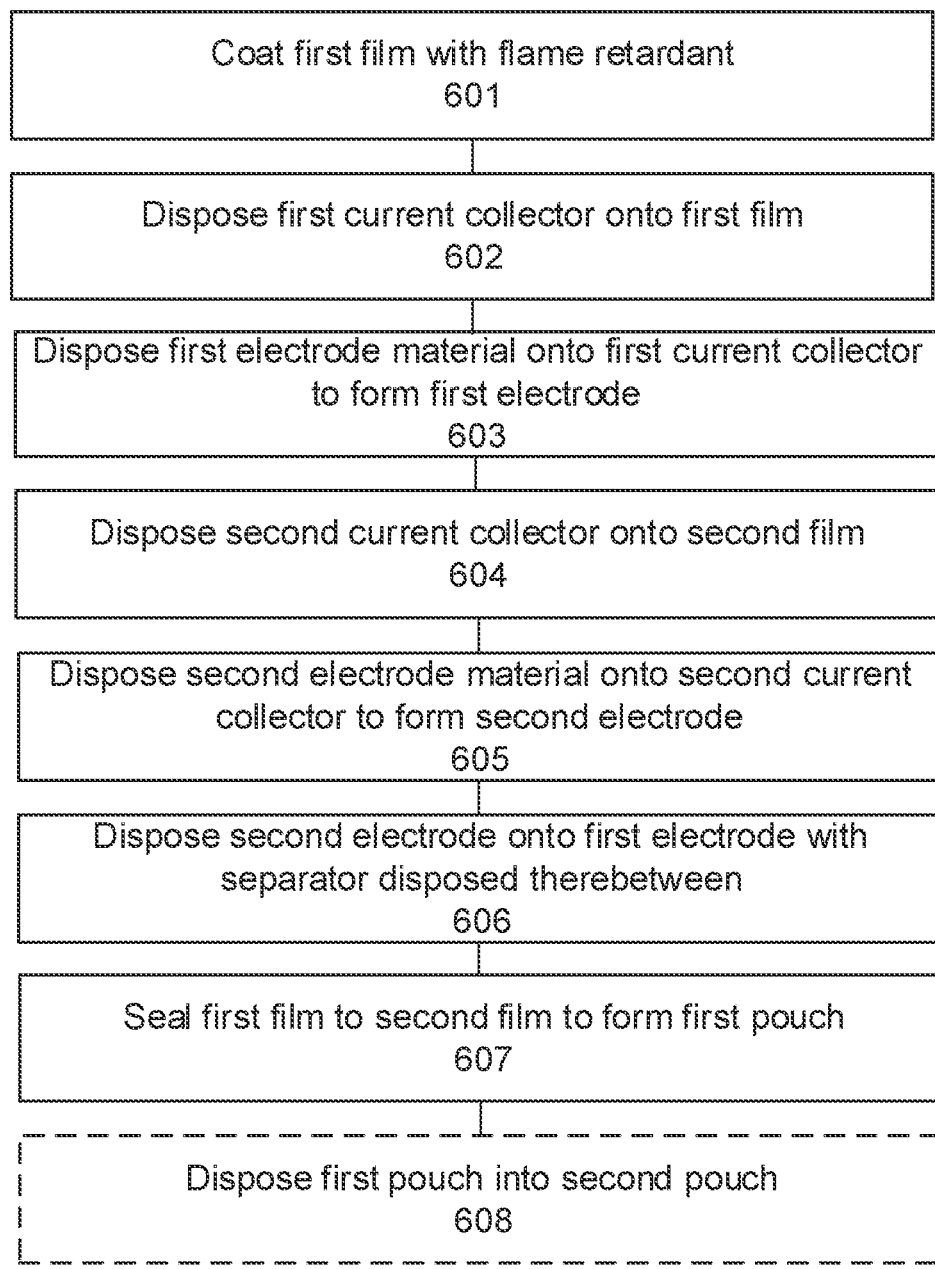
FIG. 6 is a method flowchart for manufacturing electrochemical cells and modules with flame retardant mechanisms, according to an embodiment.

FIG. 6 shows a method 600 for manufacturing electrochemical cells and modules with flame retardant mechanisms. The method 600 includes coating a first film with a flame retardant at step 601 disposing a first current collector onto the first film at step 602, disposing a first electrode material onto the first current collector to form a first electrode at step 603, disposing a second current collector onto a film at step 604, disposing a second electrode material onto the second current collector to form a second electrode at step 605, disposing the second electrode onto the first electrode with a separator disposed therebetween at step 606, sealing the first film to the second film to form a first pouch at step 607, and optionally disposing the first pouch into a second pouch at step 608.

In some embodiments, the flame retardant used to coat the first film at step 601 can be the same or substantially similar to the flame retardant 170, as described above with reference to FIG. 1. In some embodiments, the first film can be a porous film. In some embodiments, the first film can be nonporous or substantially nonporous. In some embodiments, the first film can have the same or substantially similar properties to the pouch 140, as described above with reference to FIG. 1. In some embodiments, the flame retardant can be coated onto the first film via brushing, spraying, vapor deposition, vacuum deposition, sputter deposition, vacuum evaporation, plating, electroplating, painting, immersion dip coating, roller coating, or any combination thereof. In some embodiments, the flame retardant can include a flame retardant powder. In some embodiments, the flame retardant powder can be mixed with a binder. In some embodiments, the binder can facilitate binding of the flame retardant powder to the first film. In some embodiments, the flame retardant can be infused into the first film. In some embodiments, the flame retardant can migrate into the pores of the first film. In some embodiments, the first film can be composed of a network of fibers and the flame retardant can infuse into the interstitial regions between the In some embodiments, the current collector can be disposed onto the first film at step 602 via any of the methods described in the '587 patent. In some embodiments, the first film can be laminated to the current collector. In some embodiments, the first film can be coupled to the current collector via an adhesive.

At step 603, a first electrode material is disposed onto the current collector to form a first electrode. In some embodiments, the first electrode material can be disposed onto the current collector via dispensation through a nozzle. In some embodiments, the first electrode material can be conveyed and/or pressurized, for example using a piston pump, peristaltic pump, gear/lobe pump, progressing cavity pump, single screw extruder, conveying section of a twin screw extruder, and/or any other suitable conveying device. In some embodiments, the torque and/or power of the conveying device, the pressure at the conveying device exit, the flow rate, and/or the temperature can be measured, monitored and/or controlled during the conveying and/or pressurizing. In some embodiments, the first electrode material can be prepared prior to placing onto the first current collector at step 603. In some embodiments, the first electrode material can be a conventional solid electrode material. In some embodiments, the first electrode material can be a semi-solid electrode material. In some embodiments, the semi-solid electrode material can be produced via methods described in the '970 patent. In some embodiments, the first electrode can include an anode. In some embodiments, the first electrode can include a cathode.

At step 604, a second current collector is disposed onto a second film. In some embodiments, the second film can be a porous film. In some embodiments, the second film can be nonporous or substantially nonporous. In some embodiments, the second film can be coated with a flame retardant. In some embodiments, the second film can be coated with the same flame retardant as the first film. In some embodiments, the film can be coated with a different flame retardant from the first film. For example, the first film can be coated with a flame retardant that produces a flame suppressing gas and the second film can be coated with a flame retardant that produces a liquid. In some embodiments, the second film can be sealed to the first film via lamination. At step 605, a second electrode material is disposed onto the second current collector to form a second electrode. In some embodiments, the second electrode can have any of the properties of the first electrode, as described above with reference to step 603. In some embodiments, the second electrode can include an anode. In some embodiments, the second electrode can include a cathode.

At step 606, the second electrode is disposed onto the first electrode with a separator disposed therebetween to form an electrochemical cell. At step 607, the first film is sealed to the second film to form a first pouch. In some embodiments, the second film can be sealed to the first film with an adhesive.

At step 608, the first pouch is optionally disposed in a second pouch. In some embodiments, the second pouch can be slightly larger than the first pouch. In some embodiments, a flame retardant can be coated onto the second pouch. In some embodiments, the second pouch can have the same or substantially similar properties (i.e., thickness, materials of composition) as the first pouch. In some embodiments, the second pouch can have different properties from the first pouch.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
   a first current collector coupled to a first portion of a first pouch, the first current collector having a first electrode material disposed thereon;
   a second current collector coupled to a second portion of the first pouch, the second current collector having a second electrode material disposed thereon;
   a separator disposed between the first electrode material and the second electrode material, the first portion of the first pouch coupled to the second portion of the first pouch to enclose the electrochemical cell;
   a first flame retardant material disposed on a first portion of the first pouch, the first portion proximate the first electrode material;
   a second flame retardant material different from the first flame retardant material, the second flame retardant material disposed on a second portion of the first pouch, the second portion proximate the second electrode material; and
   a second pouch, the second pouch enclosing the first pouch, and the first flame retardant material, and the second flame retardant material.

2. The electrochemical cell of claim 1, wherein the first flame retardant material includes a gas suppression precursor that produces a flame suppressing gas above a threshold temperature.

3. The electrochemical cell of claim 2, wherein the gas suppression precursor includes at least one of urea, urea-formaldehyde resins, dicyandiamide, melamine, polyamide, melamine cyanurate, melamine borate, melamine phosphate, melamine polyphosphate, melamine-poly (aluminum phosphate), $Li_2CO_3$, $NaHICO_3$, $PbCO_3$, and polycaprolactam.

4. The electrochemical cell of claim 1, wherein the first flame retardant material includes at least one of a metal hydroxide, aluminum trihydroxide, magnesium hydroxide, calcium hydroxide, potassium hydroxide, or lithium hydroxide.

5. The electrochemical cell of claim 1, wherein the first flame retardant material includes at least one of chlorinated paraffins, hexabromocyclododecane, decabromodiphenyl ether, tetrabromophthalic anyhydride, tetrabromobisphenol A (TBBPA), hexachlorocyclopentadiene, tetrachlorphthalic anhydride, chlorendic acid, polybrominated biphenyl (BB), polybrominated diphenyl ether (PBDE), hexabromocyclododecane (HBCD), 2,4,6-tribromophenol (TBP).

6. The electrochemical cell of claim 5, wherein the second flame retardant material includes at least one of antimony trioxide, molybdenum trioxide, sodium antimonate, barium metaborate, or ammonium fluoroborate.

7. The electrochemical cell of claim 1, wherein the first flame retardant material includes an ionic liquid, 1-vinyl-3-(diethoxyphosphoryl)-propylimidazolium bromide, 1-Ethyl-3-methylimidazolium chloride, 1-ethyl-3-methylimidazolium bromide, 1-ethyl-3-methylimidazolium methylphosphonate, 1-ethyl-3-methylimidazolium tetrafluoroborate, 1-ethyl-3-methylimidazolium hexafluorophosphate, and/or 3-hexyl-1-methyl-1-H-imidazol-3-ium bromide.

8. The electrochemical cell of claim 1, wherein the first flame retardant material includes a liquid and/or a solid material that melts above a threshold temperature to suppress a flame.

9. The electrochemical cell of claim 8, wherein the first flame retardant material includes Isopropyl Phenyl Diphenyl Phosphate (IPPP), Diphenyloctyl phosphate (DPOF), Triphenyl Phosphate (TPP), Dimethyl methylphosphonate (DMMP), Triethyl Phosphate (TEP), and/or Trimethyl Phosphate (TMP).

10. The electrochemical cell of claim 1, wherein the first flame retardant material includes a foaming flame suppressor that produces a foam above a threshold temperature.

11. The electrochemical cell of claim 1, wherein the first pouch includes polymer materials, polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), inorganic ceramics, aluminum oxide (Al2O3), boron nitride, carbon belt, cloth with flame retardant treatment, cloth with insulation treatment, cast polypropylene (c-PP), polyethylene (PE), ethylene vinylacetate (EVA), poly-vinyl acetate (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), and/or polyphenylene oxide (PPO).

12. The electrochemical cell of claim 1, wherein the first flame retardant material is configured to activate at a threshold temperature, and a third portion of the first pouch is substantially free of the flame retardant material such that the first pouch remains substantially intact after activation of the first flame retardant material.

13. The electrochemical cell of claim 1, wherein the first portion of the first pouch is on an internal surface of the first pouch.

14. The electrochemical cell of claim 1, wherein the first flame retardant material is disposed on at least about 50% of a surface area of the internal surface of the first pouch.

15. The electrochemical cell of claim 1, wherein the first portion of the first pouch is on an internal surface and an external surface of the first pouch, the first flame retardant material disposed on the internal surface and the external surface of the first pouch.

* * * * *